US011157739B1

(12) United States Patent
Iskandar et al.

(10) Patent No.: US 11,157,739 B1
(45) Date of Patent: Oct. 26, 2021

(54) MULTI-USER COMPUTER GENERATED REALITY PLATFORM

(71) Applicant: Apple Inc., Cupertino, CA (US)

(72) Inventors: Edwin Iskandar, San Jose, CA (US); Igor L. Gorelik, San Jose, CA (US); Charles Magahern, San Francisco, CA (US); Stephen E. Pinto, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/554,402

(22) Filed: Aug. 28, 2019

Related U.S. Application Data

(60) Provisional application No. 62/725,781, filed on Aug. 31, 2018.

(51) Int. Cl.
 *G06K 9/00* (2006.01)
 *G06F 16/58* (2019.01)
 (Continued)

(52) U.S. Cl.
 CPC ..... *G06K 9/00671* (2013.01); *G06F 16/5866* (2019.01); *G06T 7/70* (2017.01);
 (Continued)

(58) Field of Classification Search
 None
 See application file for complete search history.

(56) References Cited

U.S. PATENT DOCUMENTS

2007/0078636 A1* 4/2007 Elsberg ................ G06F 30/13
 703/2
2011/0242134 A1 10/2011 Miller et al.
 (Continued)

FOREIGN PATENT DOCUMENTS

EP         2793127 A1    10/2014
WO    2015/192117 A1    12/2015
 (Continued)

OTHER PUBLICATIONS

International Preliminary Report on Patentability received for PCT Patent Application No. PCT/US2018/052732, dated Apr. 9, 2020, 20 pages.
 (Continued)

*Primary Examiner* — Michelle Chin
(74) *Attorney, Agent, or Firm* — Dentons US LLP

(57) ABSTRACT

The present disclosure relates to providing a multi-user computer generated reality ("CGR") session. In some embodiments, a first electronic device displays a CGR environment, wherein the CGR environment is responsive to input from the first electronic device and a second electronic device, wherein the second device is external to the first device. While displaying the CGR environment, the device obtains a first scene graph from a process executing on the first device, wherein the first scene graph includes information for rendering a first entity, and obtains a second scene graph from a process executing on the second device, wherein the second scene graph includes information for rendering a second entity. The first electronic device updates the displayed CGR environment based on the first scene graph and the second scene graph, wherein the displayed CGR environment includes a visual representation of the first and a visual representation of the second entity.

30 Claims, 8 Drawing Sheets

(51) Int. Cl.
*H04W 4/029* (2018.01)
*G06T 19/00* (2011.01)
*H04W 4/021* (2018.01)
*G06T 7/70* (2017.01)

(52) U.S. Cl.
CPC .......... *G06T 19/006* (2013.01); *H04W 4/021* (2013.01); *H04W 4/029* (2018.02)

(56) References Cited

U.S. PATENT DOCUMENTS

| | | |
|---|---|---|
| 2012/0038667 A1 | 2/2012 | Branson et al. |
| 2013/0117377 A1 | 5/2013 | Miller |
| 2014/0120887 A1 | 5/2014 | Huang |
| 2014/0285519 A1 | 9/2014 | Uusitalo et al. |
| 2014/0313197 A1* | 10/2014 | Peuhkurinen .......... G06T 17/00 345/426 |
| 2014/0327690 A1 | 11/2014 | McGuire et al. |
| 2015/0116310 A1 | 4/2015 | Baudouin et al. |
| 2016/0180598 A1 | 6/2016 | Rogers et al. |
| 2016/0196694 A1 | 7/2016 | Lindeman |
| 2020/0233681 A1 | 7/2020 | Garstenauer et al. |
| 2021/0006478 A1 | 1/2021 | Levitt |

FOREIGN PATENT DOCUMENTS

| | | |
|---|---|---|
| WO | 2016/130860 A2 | 8/2016 |
| WO | 2016/164187 A1 | 10/2016 |
| WO | 2017/027183 A1 | 2/2017 |

OTHER PUBLICATIONS

International Search Report and Written Opinion received for PCT Patent Application No. PCT/US2018/052732, dated Mar. 22, 2019, 26 pages.

Invitation to Pay Additional Fees and Partial International Search Report received for PCT Patent Application No. PCT/US2018/052732, dated Jan. 31, 2019, 16 pages.

Non-Final Office Action received for U.S. Appl. No. 16/800,562, dated Apr. 15, 2021, 16 pages.

* cited by examiner

MULTI-USER COMPUTER GENERATED REALITY PLATFORM

CROSS-REFERENCE TO RELATED APPLICATIONS

This application claims priority to U.S. Provisional Patent Application Ser. No. 62/725,781, entitled "MULTI-USER COMPUTER GENERATED REALITY PLATFORM", filed on Aug. 31, 2018, the contents of which are hereby incorporated by reference.

FIELD

The present disclosure relates generally to computer generated reality systems, and more specifically to techniques for providing a computer generated reality environment.

BACKGROUND

As the capability of electronic devices increases and their ability to output high-quality visual displays improves, applications are becoming more immersive. One such example is the increasing mainstream demand for computer generated reality applications.

BRIEF SUMMARY

Techniques described herein are usable to provide a multi-user computer generated reality ("CGR") environment and to facilitate user interaction with the environment. Such techniques optionally complement or replace other methods for providing a multi-user CGR environment. Such techniques can improve the user experience, increase privacy and security, and enable CGR interfaces (e.g., 3D interfaces) with advanced functionality.

In some embodiments, a method performed at a first electronic device with one or more processors and memory includes: displaying a computer generated reality environment, wherein the computer generated reality environment is responsive to input from the first electronic device and a second electronic device, wherein the second electronic device is external to the first electronic device; while displaying the computer generated reality environment: obtaining a first scene graph from a process executing on the first electronic device, wherein the first scene graph includes information for rendering a first entity in the computer generated reality environment; obtaining a second scene graph from a process executing on the second electronic device, wherein the second scene graph includes information for rendering a second entity in the computer generated reality environment; and updating the displayed computer generated reality environment based on the first scene graph and the second scene graph, wherein the displayed computer generated reality environment includes a visual representation of the first entity and a visual representation of the second entity.

In some embodiments, a computer-readable storage medium stores one or more programs configured to be executed by one or more processors of a first electronic device, the one or more programs include instructions for: displaying a computer generated reality environment, wherein the computer generated reality environment is responsive to input from the first electronic device and a second electronic device, wherein the second electronic device is external to the first electronic device; while displaying the computer generated reality environment: obtaining a first scene graph from a process executing on the first electronic device, wherein the first scene graph includes information for rendering a first entity in the computer generated reality environment; obtaining a second scene graph from a process executing on the second electronic device, wherein the second scene graph includes information for rendering a second entity in the computer generated reality environment; and updating the displayed computer generated reality environment based on the first scene graph and the second scene graph, wherein the displayed computer generated reality environment includes a visual representation of the first entity and a visual representation of the second entity.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

In some embodiments, a first electronic device, includes one or more processors, and memory storing one or more programs configured to be executed by the one or more processors, the one or more programs including instructions for: displaying a computer generated reality environment, wherein the computer generated reality environment is responsive to input from the first electronic device and a second electronic device, wherein the second electronic device is external to the first electronic device; while displaying the computer generated reality environment: obtaining a first scene graph from a process executing on the first electronic device, wherein the first scene graph includes information for rendering a first entity in the computer generated reality environment; obtaining a second scene graph from a process executing on the second electronic device, wherein the second scene graph includes information for rendering a second entity in the computer generated reality environment; and updating the displayed computer generated reality environment based on the first scene graph and the second scene graph, wherein the displayed computer generated reality environment includes a visual representation of the first entity and a visual representation of the second entity.

In some embodiments, a first electronic device includes: means for displaying a computer generated reality environment, wherein the computer generated reality environment is responsive to input from the first electronic device and a second electronic device, wherein the second electronic device is external to the first electronic device; while displaying the computer generated reality environment: means for obtaining a first scene graph from a process executing on the first electronic device, wherein the first scene graph includes information for rendering a first entity in the computer generated reality environment; means for obtaining a second scene graph from a process executing on the second electronic device, wherein the second scene graph includes information for rendering a second entity in the computer generated reality environment; and means for updating the displayed computer generated reality environment based on the first scene graph and the second scene graph, wherein the displayed computer generated reality environment includes a visual representation of the first entity and a visual representation of the second entity.

DESCRIPTION OF THE FIGURES

In the following description, reference is made to the accompanying drawings which form a part thereof, and which illustrate several embodiments of the present disclosure. It is understood that other embodiments may be utilized and structural and operational changes may be made without departing from the scope of the present disclosure. The use of the same reference symbols in different drawings indicates similar or identical items.

DETAILED DESCRIPTION

Figure 1A:
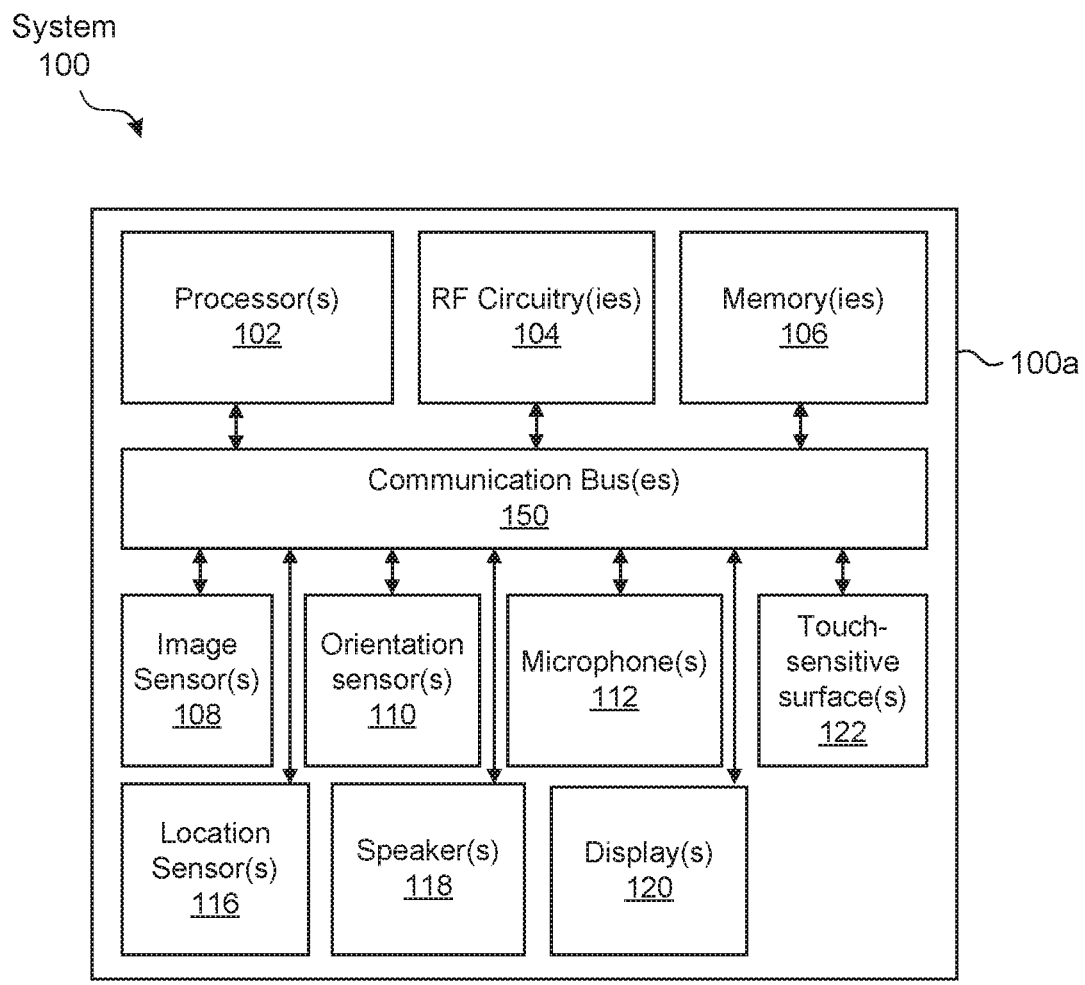
FIGS. 1A-1B depict exemplary systems for use in various reality technologies, including virtual reality, augmented reality, and mixed reality.

The following description is presented to enable a person of ordinary skill in the art to make and use the various embodiments. Descriptions of specific devices, techniques, and applications are provided only as embodiments. Various modifications to the embodiments described herein will be readily apparent to those of ordinary skill in the art, and the general principles defined herein may be applied to other embodiments and applications without departing from the spirit and scope of the various embodiments. Thus, the various embodiments are not intended to be limited to the embodiments described herein and shown, but are to be accorded the scope consistent with the claims.

Various examples of electronic systems and techniques for using such systems in relation to various computer-generated reality technologies are described.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, an MR environment is anywhere between, but not including, a wholly physical environment at one end and a VR environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of MR include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An AR environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one example, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
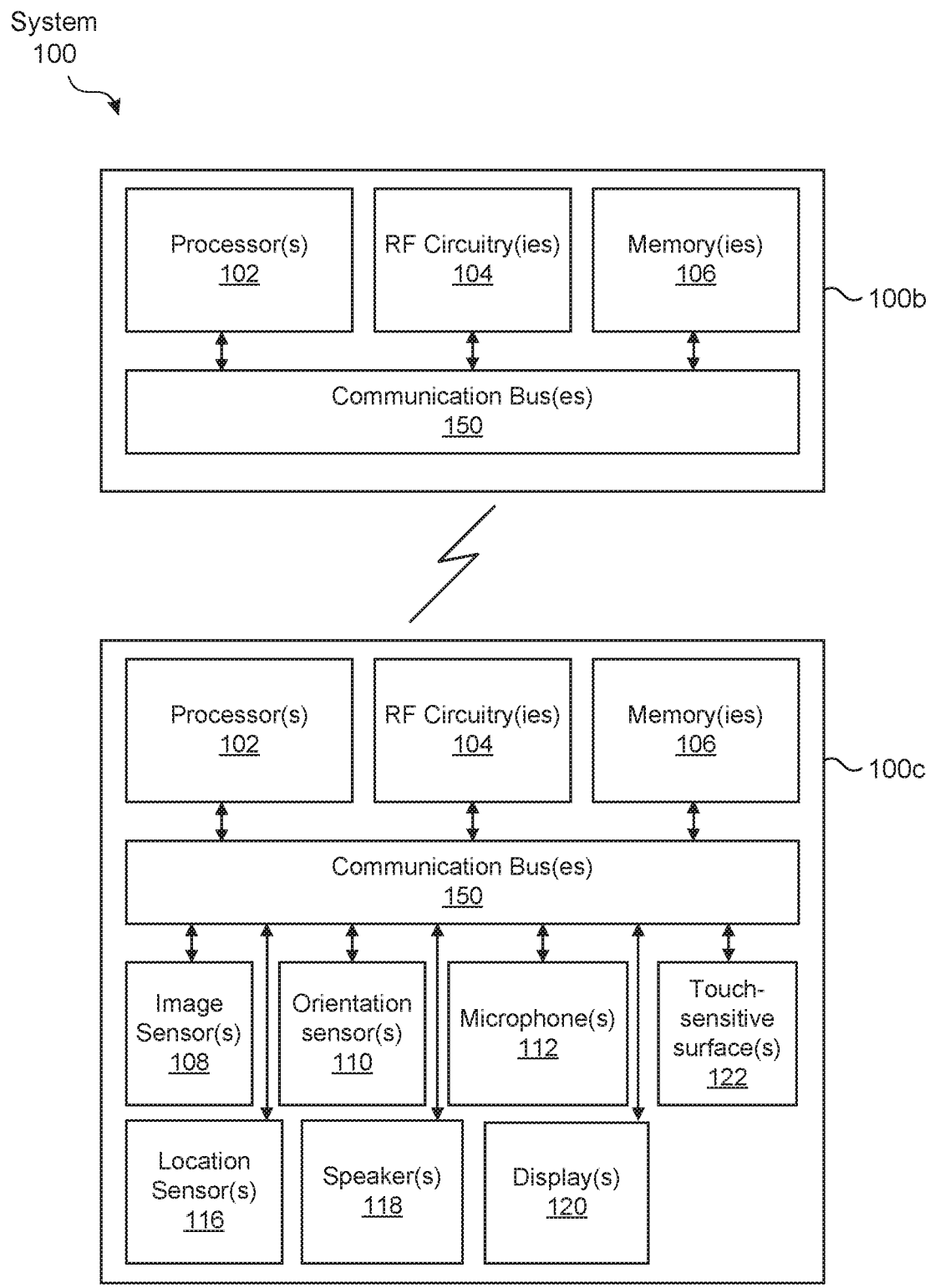

FIG. 1A and FIG. 1B depict exemplary system 100 for use in various reality technologies.

In some embodiments, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some embodiments, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100a is implemented in a base station device or a HMD device.

As illustrated in FIG. 1B, in some embodiments, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

In some embodiments, system 100 is a mobile device. In some embodiments, system 100 is a head-mounted display (HMD) device. In some embodiments, system 100 is a wearable HUD device.

System 100 includes processor(s) 102 and memory(ies) 106. Processor(s) 102 include one or more general processors, one or more graphics processors, and/or one or more digital signal processors. In some embodiments, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some embodiments, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some embodiments, system 100 includes microphones(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

1. Centralized Processing of Computer Generated Reality Environments

Embodiments of a software platform for providing a CGR environment are now described. The software platform provides a framework used by multiple processes to easily simulate and render rich CGR environments. Notably, the software platform enables a user interface that defines a 3D spatial interface, and includes content synchronized from one or more applications into a single shared simulation, thus moving beyond the conventional notion of displaying content for a single application at any given time. By not reducing content output from applications in this manner, the system can allow interaction between simulated elements (virtual content) of one application and simulated elements (virtual content) of another application using a centralized process. Additionally, the software platform can be used to create simulations that are shared between multiple devices (e.g., each running one or more applications). For example, a plurality of users can experience (e.g., via a display on their respective devices) a simulated CGR environment, where the users (who are operating separate devices in separate locales) can interact with one another in a shared virtual space on respective separate devices, wherein the shared space includes content that is synchronized, thus creating the perception to each user that they are present in the same space.

In some embodiments, the software platform is implemented using an operating-system-level ("OS-level") process for simulating and rendering content in the CGR environment, and one or more application-level processes for providing information related to the content to be simulated and rendered to the OS-level process. As used herein, an OS-level process is used to refer to a process with kernel-level execution privileges. As one of skill in the art would appreciate, an OS typically has a kernel, which is a function or program with control over the computing system that acts as an interface between applications and device hardware. For example, a process with kernel-level execution privileges typically has the highest-level privilege for accessing device resources, including the ability to access input/output ("I/O") devices (e.g., display devices). As used herein, an application-level process is used to refer to a process that has lower execution privileges than that of a kernel-level process. For example, an application-level process (e.g., a third-party application) typically requests permission to access I/O devices from a process that has a higher privilege level higher than the application-level process. As one of skill in the art will appreciate, other types of device resource security schemes can be used to achieve the same or similar results (e.g., processes with varying levels of permissions and/or device resource accessibility), all of which are intended to be within the scope of this disclosure.

As described herein, in some embodiments, the software platform includes multiple software applications, which can include any combination of native applications (e.g., applications associated with and/or integrated into the operating system of the device) and third-party applications (e.g., applications associated with third-party service providers). In some embodiments, each of the application-level processes provides one or more CGR data objects to the OS-level process (a shared process), and the OS-level process in turn simulates (e.g., and renders) a single shared space CGR environment based on the received CGR data objects. This way, the OS-level process is able to simulate interactions between the various content provided by any number of applications in the CGR environment using a single shared simulation. For example, if the applications are represented by three-dimensional objects in the simulated CGR environment and one of the three-dimensional objects is a light source, the OS-level process is able to simulate the manner in which the light source illuminates the other three-dimensional objects (e.g., from other applications) in the CGR environment. In contrast, if each of the application-level processes were to individually simulate and render corresponding three-dimensional objects and provide the rendered images to the OS-level process, the OS-level process would need to alter and/or combine each of the rendered images accordingly such that the each of the rendered three-dimensional object is properly illuminated. It should be appreciated that the latter approach is more complex, time-consuming, and resource-consuming.

In some embodiments, upon a user input indicative of a request to launch a CGR environment, a CGR system (e.g., 100) initiates an OS-level process. The OS-level process simulates and renders an initial instance of the CGR environment (e.g., a three-dimensional representation of a room), for example, upon initialization or receiving content from one or more processes. Further, upon the user input indicative of a request to launch an application, the CGR system initiates an application-level process associated with the application, which in turn provides, to the OS-level process, information related to content to be simulated and rendered. The OS-level process receives the information from the application-level process and, based on the information, simulates and renders the CGR environment accordingly (e.g., simulating and rendering virtual content in the three-dimensional space). Furthermore, in some embodiments, a second application executes and sends information to the same OS-level process, which simulates the CGR environment using information from both of the concurrently executing applications. In some embodiments, the second application is executing on the same device or a remote device.

In some embodiments, the CGR environment is a shared space CGR environment, or a CGR environment that can include content from multiple different sources (e.g., applications, centralized processes, devices, users, etc.). By way of example, a CGR data object (described below) is created by an application-level process and provided to the OS-level process, which in turn renders the virtual object in the shared space CGR environment concurrently with one or more other virtual objects.

The centralized simulation and rendering of a CGR environment at runtime (e.g., by an OS-level process) in accordance with the techniques described herein can provide several benefits. For example, displaying content from various applications that can interact in the CGR environment is much more easily accomplished, as compared to conventional techniques (e.g., where an OS process receives image data that has already been rendered by an application). As another example, privacy and security can be improved, by limiting what is shared with applications executing in a shared CGR environment. As yet another example, objects in a CGR environment can be easily captured for recording and/or playback, or for synchronizing with remote devices concurrently viewing a shared CGR environment. Further, benefits of the software platform in accordance with the techniques described herein can extend to the development of CGR environments, for example, by providing a streamlined framework for the development of CGR applications.

2. Data Structures for Computer Generated Reality Simulations—CGR Data Objects

In some embodiments, a process (e.g., an application-level process) specifies content to be simulated and rendered to an OS-level process via one or more data objects (also referred to as "CGR data objects" or "CGR objects"). A CGR data object specifies various aspects (e.g., characteristics) of a three-dimensional representation of an entity (e.g., virtual objects such as a table, a light source, an avatar) in the CGR environment. In some embodiments, the CGR data object is a data structure that includes one or more of: property data, event data, and behavior data. In some embodiments, the CGR data object includes a reference (e.g., file path, URL, pointer, or the like) to data. For example, a CGR data object can include a reference to a 3D model (e.g., a property), wherein the 3D model data is stored outside of the CGR data object (e.g., elsewhere in device memory).

Property data can include any data necessary to simulate and render a three-dimensional representation of the entity in a particular state, such as: position, orientation (e.g., coordinates), shape, size, texture, mass, animation, sound, and material. In some embodiments, a centralized process (e.g., an OS-level process) includes one or more subsystems, such as subsystems directed to: graphics, audio, physics simulation, animation, and AI. In some embodiments, property data includes data that is processed by the subsystems. For example, property data can include: 3D models, sound effects data, collision shapes (e.g., convex hulls), constraints (e.g., joints, motors), material properties (e.g., friction, restitution), animations (e.g., keyframed data), current position, target position, and a decision tree. In some embodiments, a graphics subsystem renders the 3D models. In some embodiments, an audio subsystem plays the sound effects. In some embodiments, a physics subsystem simulates dynamics using the collision shapes, constraints, and material properties. In some embodiments, an animation subsystem plays back the animations using the keyframed data. In some embodiments, an AI subsystem calculates a path based on the current position and the target position and/or evaluates the decision tree. In some embodiments, the entity represented by the CGR data object corresponds to a physical entity in the physical environment, and the CGR system obtains the property data based on the characteristics of the physical entity (e.g., via visual inspection of a captured image, using machine learning). Property data can further include settings associated with the entity, such as a name and access privilege data.

Event data defines state changes that can trigger responses by the entity. For example, the event data can specify a touch event (e.g., the entity is responsive to a touch input), a click event (e.g., the entity is responsive to a click input), etc.

Behavior data specifies behaviors that the entity is capable of exhibiting. In some embodiments, behavior data includes instructions that control the execution and flow of data between subsystems for simulating an entity represented by a CGR data object. For example, a CGR data object can include data specifying that the object has a "physics behavior", which indicates to a centralized process that the object should be processed as part of the shared physics simulation (e.g., processed by the physics subsystem, so that other objects in the simulation can collide with it and bounce off). This "behavior" is a piece of custom or predefined logic which can add or remove the CGR data object to or from a subsystem simulation, and can read the simulation result to update the CGR data object (e.g., update a position property of the object after processing by the physics subsystem). Examples of other behaviors include "graphics behavior", "audio behavior", "animation behavior", "AI behavior", or the like. Additional examples of behaviors include "StaticObject" behavior (e.g., for a building), "DynamicObject" behavior (e.g., for a ball), and "Animal" behavior (e.g., for a dog). For example, a CGR data object can include "StaticObject" behavior, which defines an object that has a physical representation (e.g., collision shape, material), but is immovable and is not simulated by the physics system—it is only rendered by the graphics system. For example, a CGR data object can include "DynamicObject" behavior, which defines an object that has a physical representation (e.g., collision shape, material) that is simulated by the physics subsystem—the results of the physics simulation are then used to update the graphics model, which is rendered by the graphics system. If there is a collision, it can trigger a sound effect, which is played back by the audio subsystem. For example, a CGR data object can include "Animal" behavior, which causes an AI subsystem to evaluate a decision tree defining animal-like behaviors (e.g., for simulating humans, dogs, cats, etc.). The decision tree evaluation can define which animations (e.g., 3D model poses) are played back by the animation system (e.g., at a given time, in response to a given interaction, etc.). The resulting animation poses drive the collision shapes in the physics simulation and the model rendered by the graphics subsystem. Behaviors can include being able to be picked up, being able to be pushed, being able to collide with another three-dimensional representation in the CGR environment, and being able to behave in accordance with gravity. The behavior data can specify complex behaviors, such as human behaviors, canine behaviors, etc.

In some embodiments, for system integrity, CGR data objects cannot specify arbitrary code that is executed in the centralized process (e.g., OS-level process). However, a centralized process can provide access to a library of secure, predefined behaviors that CGR data objects can utilize (e.g., by including a reference to one or more of the behaviors). In such example, "behaviors" are predefined pieces of logic (e.g., 'path following logic' in the centralized process) that can be attached to CGR data objects (e.g., invoked by including a particular behavior or reference in the data object, such as "DynamicObject" or "Animal"). In some embodiments, behavior data can include a custom (e.g., user-defined) script or logic that defines an AI behavior (e.g., used by an AI subsystem). In some embodiments, the property data of the CGR data object includes one or more parameters (e.g., movement target, speed) and/or states for the AI behavior (e.g., which can be referred to as "AI properties").

In some embodiments, a virtual object represents an application itself—when the application is run, it is exhibited as a 3D object in the CGR environment (e.g., that can be interacted with). Thus, interaction with the visual representation representing the application is the interface with the application, and can cause a sub-process of the application to be executed or otherwise become active.

A CGR data object can be created by either an application process or an OS-level process. For example, a virtual environment that simulates a user's nearby physical environment can include an object created by an application (e.g., a lamp that does not correspond to an entity in the physical environment) and the OS-level process can contribute a CGR data object representing a virtual rendering of a table (e.g., that does correspond to an entity in the physical environment). Thus, the use of CGR data objects as described herein can allow content to be contributed to a shared space (e.g., being rendered by the OS-level process), regardless of the source of the CGR data object. By extension, as will be discussed in greater detail below, a CGR data object from a remote source (e.g., an application executing on a different device by a different OS-level process) can additionally or alternatively be rendered in the shared space of the OS-level process.

CGR data objects are lightweight data structures, for example, that describe properties and behaviors of objects that will be placed in a CGR environment. Accordingly, CGR data objects are easily and efficiently shared between processes (e.g., from an application-level processes to an OS-level process, using IPC) and devices (e.g., between remote devices simulating the presence of two remote users in a virtual environment simulated at both devices). The lightweight nature of CGR data objects can allow what would otherwise be a calculation-heavy simulation and rendering of the CGR environment to be performed by a single, centralized process (e.g., an OS-level process) that receives the CGR objects. Information not necessary for defining the virtual object can be omitted, such as rendering routines or information found in a common library.

CGR data objects are used to represent objects in the virtual world. As described above, CGR data objects include data for simulating and rendering objects. For example, a simulation of a virtual room can have CGR data objects respectively representing each of the room, the table in the room, an avatar representing the user present in the room, procedural content in the room, and the like.

In some embodiments, CGR data objects include additional data. In some embodiments, CGR data objects include one or more privacy-related properties. For example, a CGR data object can include a property that indicates that the object should not be shared (e.g., not be visible to other users). For instance, if a first user invites a second user into a shared virtual space in a CGR environment that simulates the first user's home, there are certain objects in the first user's home that they would not want to be visible to the second user (e.g., a business card laying on a table). Accordingly, a CGR data object representing those certain objects can include (e.g., by default or designated so by a user) a property that prevents such objects from being shared. In some embodiments, an object can be shareable, but have one or more properties (e.g., less than all of its properties) that are designated as not shareable in the representative CGR data object. For example, in the case of a business card, texture of the object representing the card can be designated as a non-shareable property (e.g., the second user would be shown the shape of the card, but name and phone information are not reproduced, for example, by substituting the graphic content for a generic texture, such as a solid color). In some embodiments, the software platform can share properties of data objects with other users selectively, such as with user-based permission. Thus, an object can be shared with a designated trusted user (e.g., a spouse), but not with an untrusted user (e.g., an acquaintance), as specified by the user.

It should be noted that the privacy-related properties can be used not only to prevent sharing of content with other users, but also to prevent unauthorized or unnecessary sharing with other applications. Due to the framework provided by the software platform, an application does not need information about the CGR environment in order to contribute content to the CGR environment. Rather, the application passes one or more CGR data objects that define objective properties and behaviors of objects, to a centralized OS-level process (e.g., via interprocess communication ("IPC")) which performs the simulation and rendering. Thus, the OS-level process has information about the CGR environment, including any other content contributed by other applications running therein, but such information is not necessarily shared with all applications. However, in the case that an application is provided access to data about other objects in the CGR environment (e.g., by the user), the scope of what is shared between applications can be controlled in the same way as described above with respect to other devices. For example, an application might be provided information that a person is present in the room with the user, but the application is not provided detailed visual information (e.g., depiction of facial features) of the person.

The foregoing examples are intended to assist in an understanding of the present technology. It is noted that the present disclosure relates to underlying technologies that can be used to communicate information. Out of an abundance of caution, entities that employ these technologies to convey information that may be viewed as personal information data are advised to comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. Indeed, the present disclosure contemplates embodiments in which information may be controlled to improve privacy. Nonetheless, the present technology can be configured to allow users to select to "opt in" or "opt out" of participation. It is the intent of the present disclosure to provide technologies improving the security of data that they consider to be personal, whether that is a business card, a calendar of events, and so forth.

Other features of the CGR data object include the ability to be synchronized across multiple devices. For example, in a CGR environment that is concurrently being rendered by two or more remote devices, the virtual content (represented by CGR data objects) within the CGR environment can be synchronized so that changes are seen in both simulations. Accordingly, in some embodiments, the software platform synchronizes properties between devices (e.g., at regular intervals, in response to a change, etc.). For example, the software platform can save a snapshot of a CGR data object at a given point in time (or over a period of time), and send it to other devices sharing in the same simulation. The software platform on the remote device can receive and process the data (e.g., which can include updating an instance of the CGR data object, stored at the receiving device, with received data), and update a simulation at the second device accordingly. In some embodiments, the simulation of the CGR data object is performed at each device, but one simulation has authority over the others (e.g., the host user that invited the other users (devices) into the CGR environment or shared virtual space). Synchronization of CGR data objects are described in more detail below with respect to FIGS. 2-4, which depict an exemplary shared virtual space session between two devices.

In some embodiments, a system (e.g., 100) performs storing and loading of CGR scene data (e.g., retrieve CGR data objects from memory), recording of CGR scene data (e.g., capture CGR scene data (CGR data objects) at a particular time), playback of CGR scene data (e.g., retrieve the appropriate CGR scene data for a particular time, for simulation and rendering by the CGR engine), and synchronization of CGR scene data over a network (e.g., handling the exchange of CGR data object data and associated changes so that a shared virtual space between two users maintains synchronization). In the case of synchronization, for example, an I/O subsystem (e.g., a process of the OS) can ensure that a change in the CGR environment of one user (e.g., at a first device) is reflected in the CGR environment of another user (e.g., at a second device), where each device is simulating and rendering a shared CGR environment (e.g., a shared virtual space).

Figure 2:
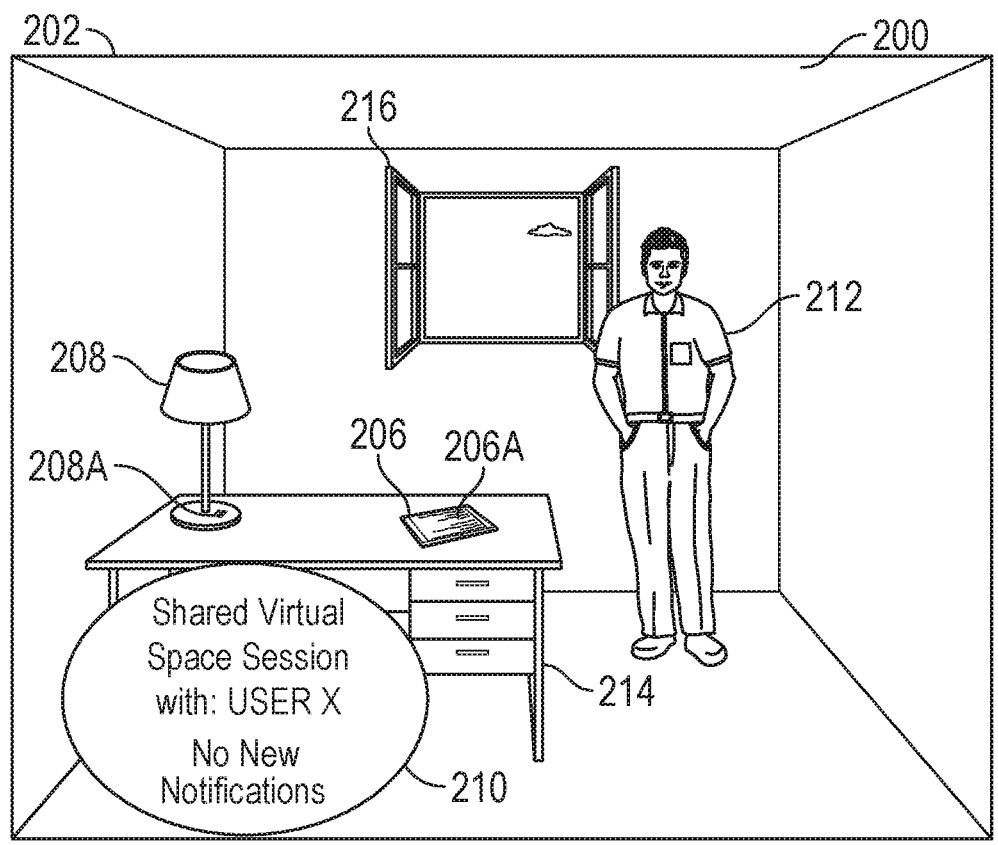
FIG. 2 illustrates an exemplary computer generated reality environment displayed from multiple views.
Figure 2:
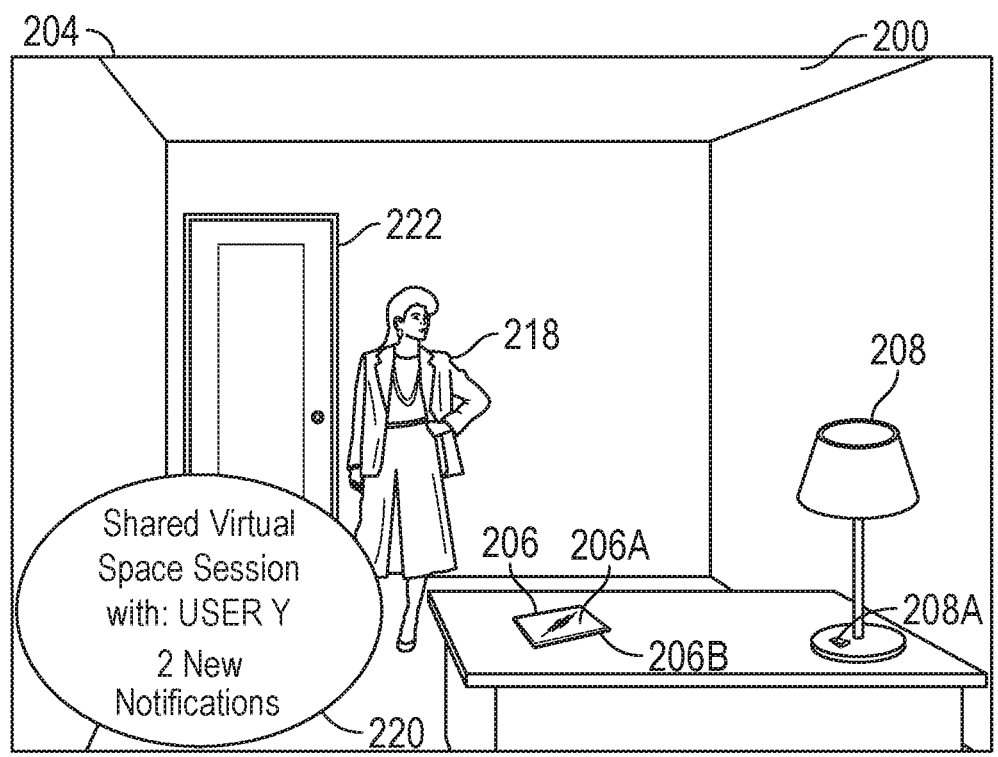

An exemplary application of CGR environment synchronization is used for shared virtual space sessions. FIG. 2 illustrates an exemplary shared virtual space session between two users each using a respective device. In some embodiments, a shared virtual space session includes simulation of a shared CGR environment at two or more different devices (e.g., each being used by a different user). In the shared virtual space session of FIG. 2, two users using two different devices are placed into a shared CGR environment 200. A first device (e.g., 302 of FIG. 3A) (e.g., associated with a first user) includes an application App 1 (e.g., process 302B of FIG. 3A) executing in communication with a centralized process (e.g., process 302A of FIG. 3A) of an operating system of the first device. A second device (e.g., 304 of FIG. 3A) (e.g., associated with a second user) includes an application App 4 (e.g., process 304B of FIG. 3A) executing in communication with a centralized process (e.g., 304A of FIG. 3A) of an of an operating system of the second device. Applications App 1 and App 4 can be different instances of the same application (e.g., a shared virtual space application), executing on different devices. In some embodiments, the shared virtual space session is a process of a centralized process (e.g., 302A, 304A), rather than of an application.

Figure 3A:
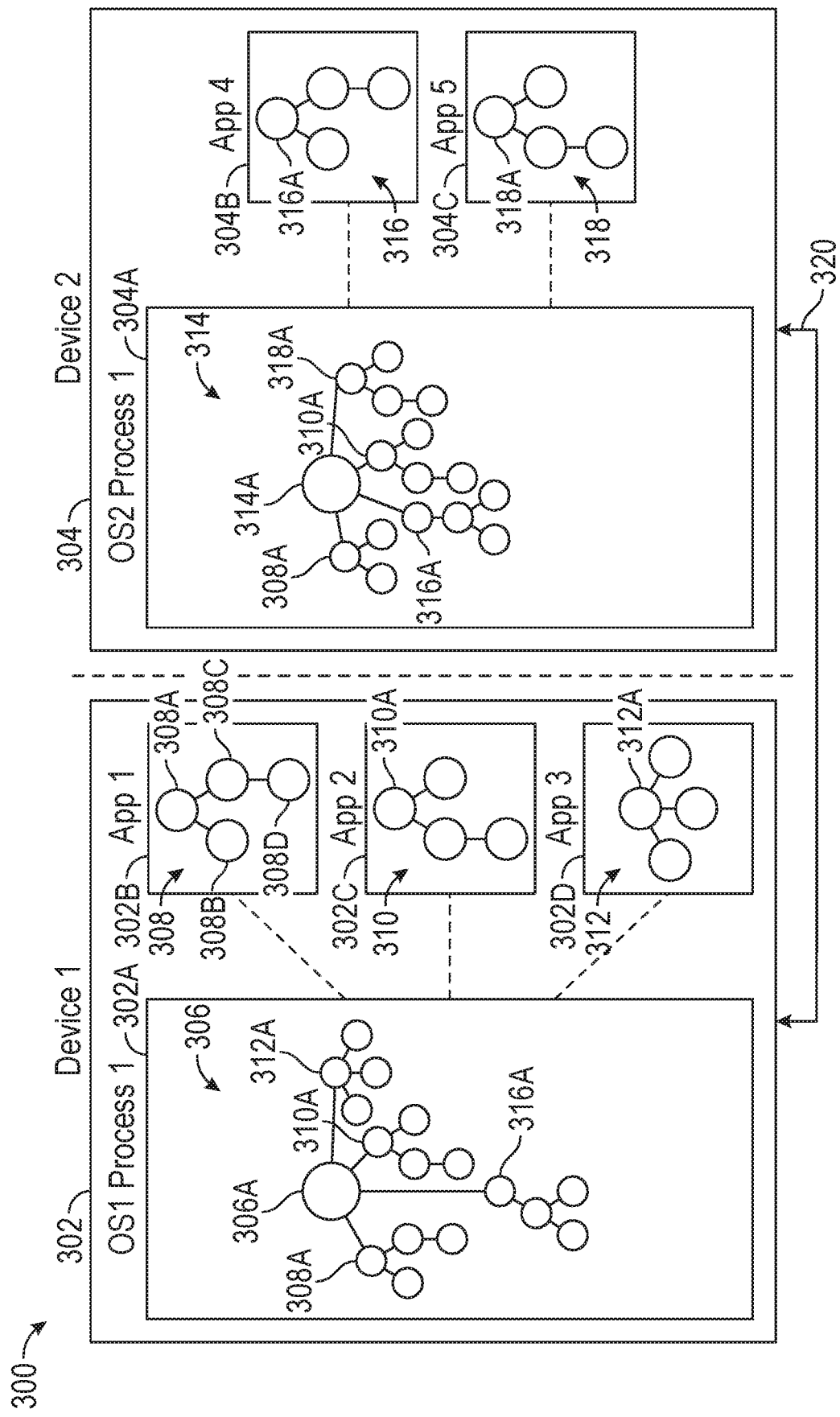
FIGS. 3A-3C illustrate exemplary block diagrams and scene graphs associated with an exemplary computer generated reality environment.

In some embodiments, to establish a shared virtual space session, a first user (e.g., of device 302) can send a request to establish a shared virtual space session, in similar manner as making a phone call, to a second user (e.g., of device 304). If the second user accepts, for example, avatars for the first user (e.g., 218) and the second user (e.g., 212) can be placed into a shared virtual space CGR environment 200, as shown in FIG. 2. In some embodiments, the respective devices of each user receives and/or provides one or more CGR data objects for the shared virtual space session. For example, as shown in FIG. 3A, devices 302 and 304 are connected via communication link 320 (e.g., connected directly (e.g., via Wi-Fi), over a local area network, over a wide area network, or any suitable manner for exchanging data). Device 302 provides a CGR data object to device 304 (e.g., representing first user avatar 218), and device 304 provides a CGR data object to device 302 (e.g., representing second user avatar 212), over the communication link 320. The CGR data objects can represent content to be simulated in the shared virtual space session, such an avatar for a user, a plant, a table, or a chair, among other things in the CGR environment.

In some embodiments, during a shared virtual space session, avatars for the respective other users will be displayed to each user as occupying the shared CGR environment of the shared virtual space session. For example, in FIG. 2, a first device (e.g., 302) displays view 202 of a shared space CGR environment 200, which includes an avatar 212 representing the second user of device 304. Thus, when the first user views the shared space (e.g., via display of view 202 using device 302), it can appear as if the second user is present in the same room. Likewise, device 304 displays view 204 of the same shared virtual space, which includes an avatar 218 representing the first user of device 302. Thus, when the second user views the shared virtual space (e.g., via display of view 204 using device 304), it can appear as if the first user is present in the same room. In this embodiment, view 202 is the simulated perspective of the avatar 218 (e.g., of the first user, of device 302), and view 204 is the simulated perspective of avatar 212 (e.g., of the second user, of device 304). In some embodiments, the user avatars can interact with each other (e.g., physical or auditory interaction) and/or with other content within the shared virtual space CGR environment 200 (e.g., interact with the table or tablet computer in the space shown in FIG. 2). For example, changes to the environment, objects, or avatars (e.g., movement) will be synchronized and reflected in the simulation at both devices, which creates the perception that the users are occupying a shared space.

While a shared virtual space session is provided as one example of a multi-user computer generated reality environment, others are possible. For example, multiple users each using their own device can synchronize the simulation of a computer generated reality environment that is an interactive gaming environment (e.g., a multiplayer game, a cooperative game, or the like). Thus, for instance, the computer generated reality environment can be dynamic and changing, based on the gameplay. In some embodiments, avatars can also be dynamic (e.g., changes throughout a game) or not displayed at all (e.g., no visual representation of another user is visible in a multi-user computer generated reality environment).

As should be appreciated based on the description above, the software platform is able to receive and process CGR data objects that were remotely defined (e.g., by another device). The efficient data structure and content of the CGR data objects allow two devices each running the software platform to easily provide a shared experience for two or more users, who are presented with CGR environments that include shared content.

3. Multi-Participant Interactive Computer Generated Reality Environments

Attention is now turned to exemplary techniques for providing a multi-device CGR environment. FIGS. 2-4 illustrate exemplary devices, techniques, and user interfaces for providing a CGR environment with multiple users at different devices. These figures are used to illustrate the processes described below, including the process of FIG. 5

FIG. 2 illustrates an exemplary CGR environment 200 displayed from two views (e.g., perspectives). In this example, exemplary view 202 (also referred to as first view 202) represents a view of CGR environment 200 displayed on a first device (e.g., device 302), and exemplary view 204 (also referred to as second view 202) represents a view of CGR environment 200 displayed on a second device (e.g., device 304) (e.g., different than the first device). In some embodiments, the first device and/or the second device include one or more features of device 100a, 100b, or 100c. In this example, first view 202 illustrates a simulated view of the environment from the perspective of a second avatar 218 in the CGR environment 200, and second view 204 illustrates the environment from the perspective of a first avatar 212 in the CGR environment 200.

As shown in the views in FIG. 2, CGR environment 200 is a simulation of a room having representations of several entities (e.g., virtual objects, also simply referred to as objects) within it. For example, as depicted in first view 202, CGR environment 200 includes a tablet computer 206 having a display 206A, a lamp 208 having a switch 208A, a first graphical information overlay 210, a second avatar 212 (e.g., associated with a second user), a table 214, and a window 216. As depicted in the second view 204, CGR environment 200 includes the tablet computer 206 having display 206A, the lamp 208 having switch 208A, the table 214, a first avatar 218 (e.g., associated with a first user), a second graphical information overlay 220, and a door 222.

In some embodiments, an entity in a CGR environment is represented by a data object (e.g., as described above). In some embodiments, two or more devices that are in a CGR session exchange (e.g., transmit and/or receive) a portion of one or more data objects representing an entity in the CGR environment. For example, tablet computer 206 can be represented by a data object created by a process (e.g., an application process or an OS process) executing on the first device (e.g., device 302 of FIG. 3A) that is shared with the second device (e.g., device 304 of FIG. 3B). As can be seen in FIG. 2, CGR environment 200 includes some objects that are visible in both views 202 and 204. For example, tablet computer 206, lamp 208, and table 214 are visible in both view 202 and 204. In this example, the first and second devices, respectively displaying views 202 and 204, synchronize data representing tablet computer 206, lamp 208, and table 214. In some embodiments, an entity in a CGR environment is represented by a scene graph. For example, scene graph representations of entities are discussed in greater detail below with respect to FIGS. 3A-3C.

The phrase "CGR session" is used to refer to the operation(s) involved in the simulation and rendering of a CGR environment by one or more devices. For example, a CGR session can include only one device simulating and rendering a CGR environment for display to one user, or a CGR session can include two or more devices that are connected and synchronizing the display of a common CGR environment. In some embodiments, a CGR session is established (e.g., between two devices) in response to user input (e.g., representing a request to start a shared virtual space session with another user).

In some embodiments, data representing one or more portions of content (e.g., an entity such as a virtual object, or a portion of a virtual object) in a CGR environment are not transmitted between devices in a CGR session. For example, the one or more portions of content can be rendered into the CGR environment displayed at one device, but is not shared with another device in a CGR session (e.g., and thus is not displayed by the other device). As can be seen in FIG. 2, CGR environment 200 includes some content that is visible in only one view 202 or 204. For example, the screen 206A of tablet computer 206 in view 204 is blank, however in view 202 the screen 206A includes a depiction of a displayed text document. Thus, even though the body of tablet computer 206 is shared between devices in the shared virtual space session that includes CGR environment 200, a portion (e.g., the displayed text document) of the object tablet computer 206 is not shared by the device that created the object.

In some embodiments, no data representing a particular entity in a CGR environment is transmitted between devices in a CGR session. For example, an entire entity displayed on a first device might not be shared at all with a second device, and thus not be displayed by the second device to the second user. In this example, first graphical information overlay 210 is only visible in view 202 displayed by the first device (e.g., of the first user), and second graphical information overlay 220 is only visible in view 204 displayed by the second device (e.g., of the second user). First graphical information overlay 210 represents an exemplary personalized virtual "graphical information overlay" object that, for example, includes information about the current state of the first device (e.g., information about what the first device is currently displaying (such as detailed information about objects that are being focused on via selection or user gaze), information about a current active application, or information about system or application notifications). For example, first graphical information overlay 210 includes text identifying that the first device is currently in a shared virtual space session and the second user ("Shared Virtual Space Session with: User X" (e.g., the second user)) and also includes notification information ("No New Notifications"). Similarly, second graphical information overlay 220 includes text identifying that the second device is currently in a shared virtual space session and the first user ("Shared Virtual Space Session with: User Y" (e.g., the first user)), and also includes notification information ("2 New Notifications"). In some embodiments, a graphical information overlay is an entity represented by a data object (e.g., created by an application process or an OS-level process) that is not synchronized between devices. For example, first graphical information overlay 210 appears as a virtual object in the CGR environment 200 at the display of view 202 and provides personalized information to user of the first device. Because such information can be considered private (e.g., notification information, a user's notes, so forth), and because the primary function of the graphical information overlay is to provide information to only one user, it is not shared with the second device. Thus, while the first device displays first graphical information overlay 210 as an object in CGR environment 200 in view 202 (e.g., as a persistent object floating in front of the position of a first avatar 218), the second device has no information regarding graphical information overlay 210, and thus does not display it. Accordingly, the second user of the second device cannot see graphical information overlay 210 or the information displayed on graphical information overlay 210 when viewing the CGR environment. Likewise, second graphical information overlay 220 is not shared by the second device with the first device, so graphical information overlay 220 is not displayed adjacent to second avatar 212 in view 202 on the first device.

In some embodiments, an object is shared with a device, but is not displayed by that device. In this example, window 216 is created by the first device and shared with the second device, however it is not displayed in view 204 as depicted in FIG. 2 because the gaze of the second user's avatar 212 (e.g., represented by view 204) is facing away from the window's position. For example, if second avatar 212 was facing the same direction as the first avatar 218 (e.g., whose gaze is represented by view 202), view 204 would be updated to include a depiction of window 216.

In some embodiments, user-interactive elements of content in a CGR environment are shared between devices. For example, switch 208A of lamp 208 is a user-interactive element that can be manipulated (e.g., via an avatar, such as 212 or 218, responsive to user input) by the user of either the first or second device. Additional details regarding such operations are discussed below.

Figure 3B:
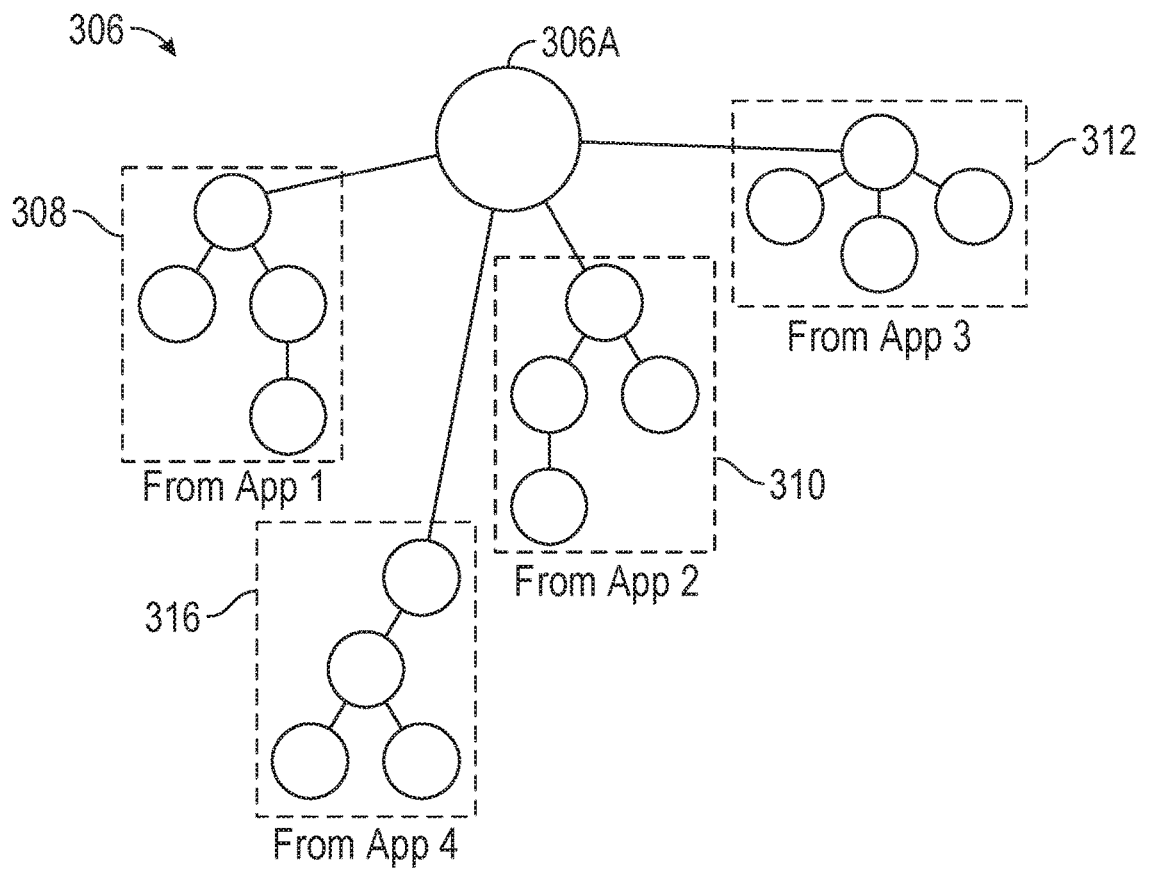
Figure 3B:
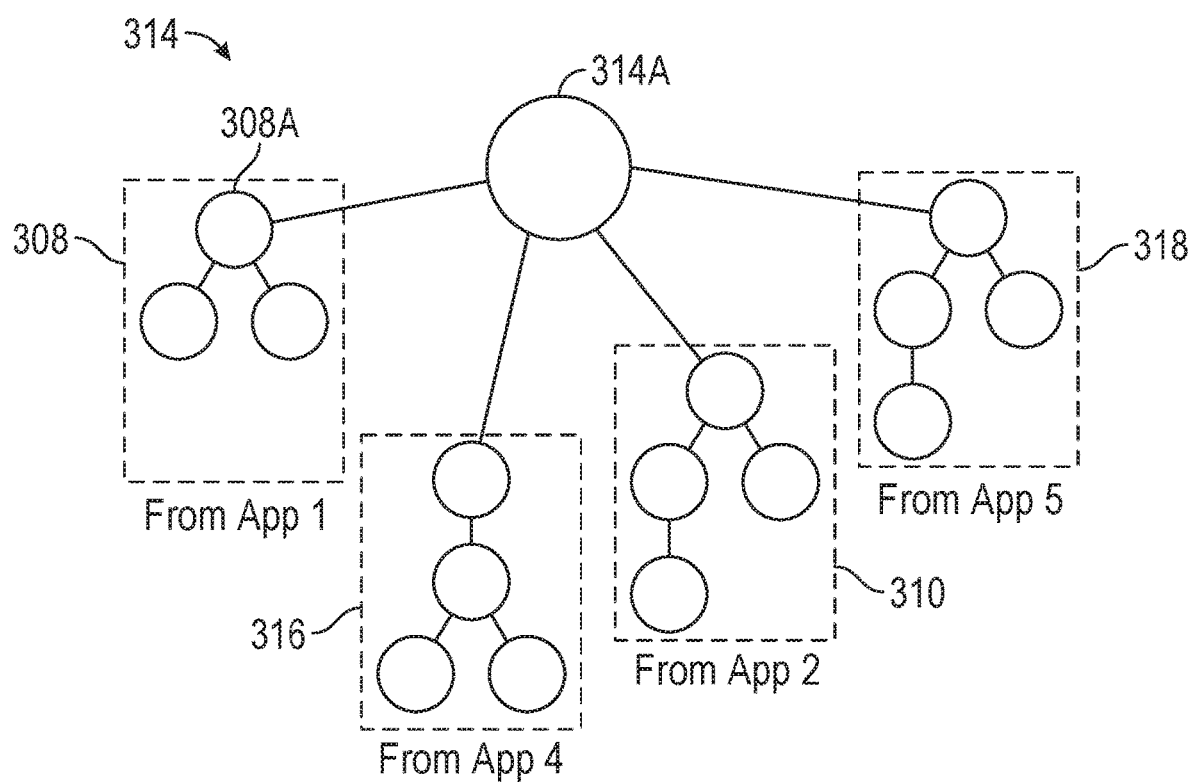
Figure 3C:
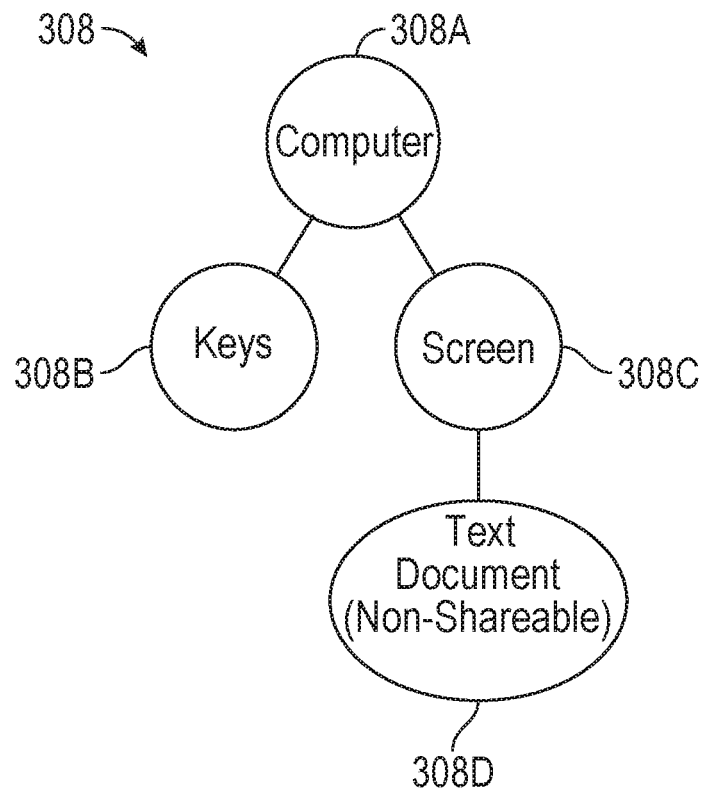
Figure 3C:
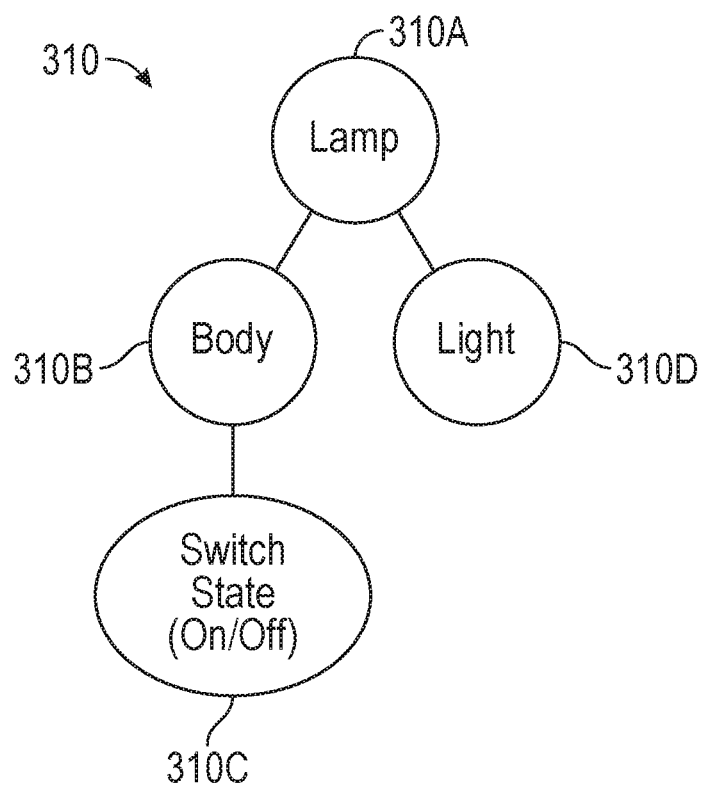
Figure 4:
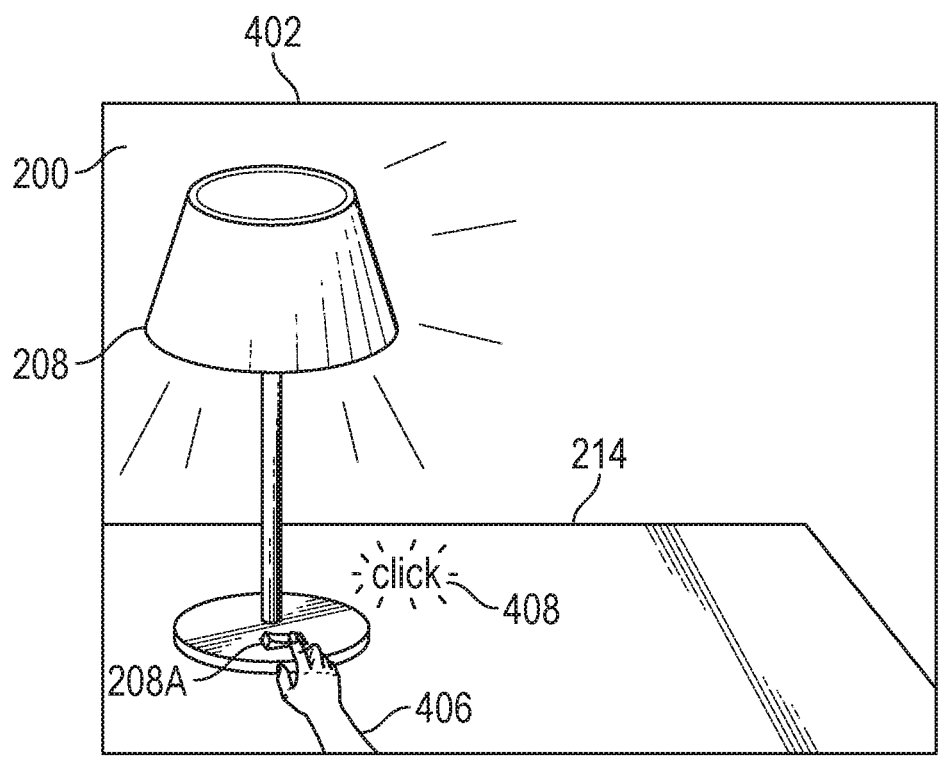
FIG. 4 illustrates an exemplary interaction with an entity in a computer generated reality environment.
Figure 4:
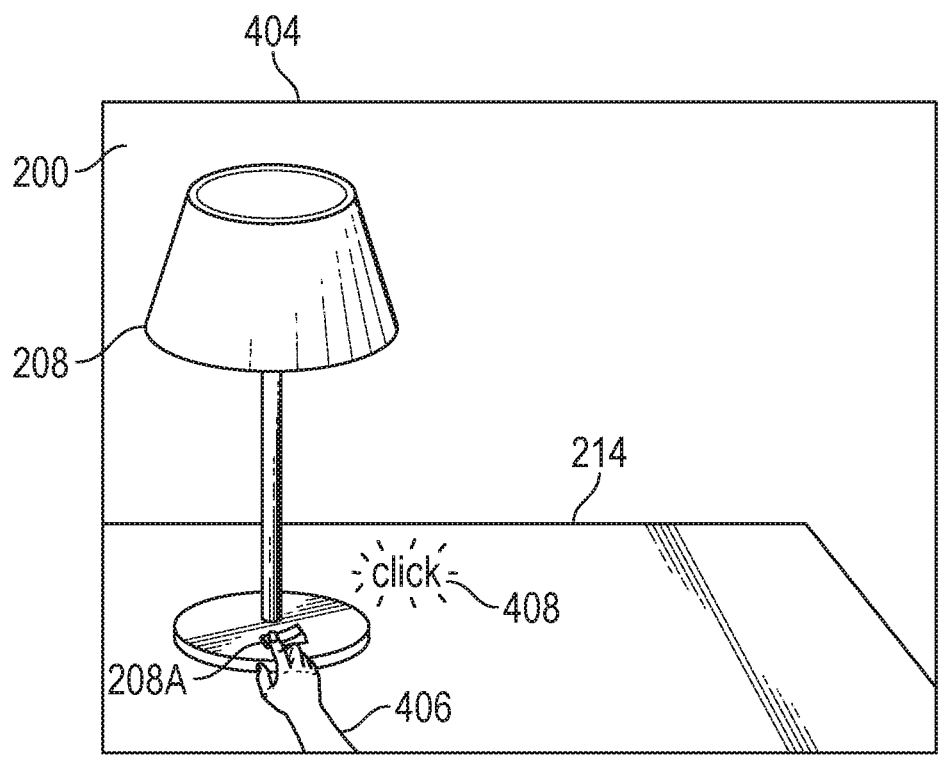

FIGS. 3A-3C illustrate exemplary scene graphs representing at least a portion of a CGR environment. As will be described in more detail below, a device process (e.g., a centralized process) can obtain one or more scene graphs (or portions thereof), and then render the CGR environment for display based on the received scene graphs. A scene graph can be obtained from one or more processes executing on the same device or on an external device.

FIG. 3A includes a block diagram 300 illustrating an exemplary simplified topology of a multi-device CGR session. For example, FIG. 3A shows multiple devices that are synchronizing the simulation of a CGR environment at each device. In some embodiments, a CGR session includes a plurality of connected devices. For example, as described above, two or more devices can be connected to each other and synchronizing the simulation of at least a portion of a CGR environment at each device (e.g., where each device is rendering the CGR environment). For example, diagram 300 includes device 302 (e.g., an exemplary first device as described above with respect to FIG. 2) and device 304 (e.g., an exemplary second device as described above with respect to FIG. 2). In some embodiments, device 302 and/or device 304 include one or more features of device 100a, 100b, or 100c or of system 100.

In some embodiments, the plurality of connected devices in a CGR session are external to (e.g., remote from) each other. In this example, device 302 and device 304 are remote from each other, and communicate via one or more communication link 320 (e.g., a network data connection).

In some embodiments, a device includes one or more operating system-level ("OS-level") processes executing on the device. For example, as shown in FIG. 3A, device 302 is executing "OS1 Process 1" (process 302A) and device 304 is executing "OS2 Process 1" (process 304A). In some embodiments, one or more OS-level processes on a device performs the simulation and rendering of the CGR environment. For example, as described above, the OS-level process 302A is a centralized process that can exclusively perform the simulation (e.g., of physics, behavior, event responses, etc.) and rendering of the CGR environment for display on device 302.

In some embodiments, a device includes one or more application-level processes executing on the device. For example, device 302 includes three applications executing thereon: Application 1 ("App 1") (process 302B), Application 2 ("App 2") (process 302C), and Application 3 ("App 3") (process 302D). Further, device 304 includes two applications executing thereon: Application 4 ("App 4") (process 304B) and Application 5 ("App 5") (process 304C). In some embodiments, an application-level process communicates with an OS-level process. For example, each application process shown in FIG. 3A is shown with a connection the OS-level processes on the same device (e.g., either 302A or 304A). The application-level processes can pass entity data (e.g., data objects, scene graphs) to an OS-level process for simulation and rendering of the entities. Likewise, the OS-level process can pass updates to the application-level processes (e.g., regarding changes to the scene graph or states of the entity, for example, resulting from user input or interaction with other entities in the CGR environment).

In some embodiments, an application represents an entity (e.g., virtual object) in a CGR environment. For example, an application executed on a device causes a virtual object to be rendered into a CGR environment, and the interface for interacting with the application is the virtual object (e.g., user interaction with the virtual object). For example, if an application is a calculator application, the application causes a calculator (e.g., with buttons and a display) to be displayed in the CGR environment (e.g., the application provides a data object and scene graph to a centralized process, which renders the calculator object into a CGR environment). A user can "use" the calculator via interaction in the CGR environment (e.g., via an avatar controlled via user input), for example, to press numeric keys on the virtual calculator, perform mathematical functions, and cause results to be displayed on the virtual calculator's display. Other non-limiting examples of objects that can represent an application in a CGR environment include: a computer (e.g., that includes a keyboard and a display), a vase, a ball, or an animal. In some embodiments, an application represents a plurality of objects in a CGR environment. For example, a virtual bowling application can include a bowling ball object and a plurality of bowling pin objects that are created in the CGR environment.

In this example, the applications depicted in block diagram 300 represent objects illustrated in the views of FIG. 2. Diagram 300 is provided as a simplified example, and does not include representations of all of the objects shown in the views of FIG. 2. However, in view of the description herein with respect to diagram 300, one of skill would appreciate how to implement the CGR environment 200 depicted in FIG. 2. In this example, App 1 (process 302B) represents tablet computer 206 of FIG. 2, App 2 (process 302C) represents lamp 208 of FIG. 2, App 3 (process 302D) represents first graphical information overlay 210 of FIG. 2, App 4 (process 304B) represents avatar 212 of FIG. 2, and App 5 (process 304C) represents second graphical information overlay 220 of FIG. 2.

In some embodiments, a device displays an entity from an application executing on another device. For example, device 304 is displaying tablet computer 206 from App 1 (e.g., displaying view 204 of FIG. 2), but is not executing an instance of App 1.

In some embodiments, the devices and/or the entities in a CGR session are dynamic. For example, a CGR session can include two devices when established and for a period of time thereafter, and then expand to include one or more additional devices. Thus, the CGR session is ongoing but expands to include additional devices (e.g., which are then synchronized with by a device in the same manner as the two pre-existing devices) and entities from the additional devices. For further example, additional entities can be added to a CGR session after it has already been established. For example, App 1 might not originally be executing on device 302 at the time that the shared virtual space session with device 304 is established. However, the user of device 302 can cause App 1 to launch, which then causes tablet computer 206 to begin to be displayed in CGR environment 200 (e.g., and synchronized between the devices)

In some embodiments, a process executing on a device creates a scene graph representing a portion of a CGR environment. For example, a process (e.g., either an application-level process or an OS-level process) creates a scene graph that represents one or more objects that are represented in a CGR environment of a CGR session. In this example, a process 302B of App 1 creates scene graph 308 (which has scene graph nodes 308A-308D), a process 302C of App 2 creates scene graph 310 (having scene graph node 310A), a process 302D of App 3 creates scene graph 312 (having scene graph node 312A), a process 304B of App 4 creates scene graph 316, and a process 304C of App 5 creates scene graph 318. Thus, in this example, App 1 (e.g., a process thereof) is responsible for creating the scene graph 308 that represents tablet computer 206 in CGR environment 200. This scene graph 308 can be provided to a process (e.g., OS-level process 302A) that performs simulation and rendering of the CGR environment using the scene graph (e.g., and other scene graphs).

A scene graph, for example, includes data usable by simulation and/or rendering processes in order to create a representation of an entity. For instance, with reference to the discussion on data objects above, a scene graph can include instructions (e.g., states, transforms, logic tests) regarding how to present a virtual object at a given point in time based on the data object data (e.g., whether a plane's door is open, whether a dog is performing a barking action, the content currently displayed on a virtual object's screen, etc.). In some embodiments, a scene graph is hierarchical. For example, a scene graph can be a tree-like structure of nodes. A scene graph can be for a single entity (e.g., a tablet computer) or a collection of entities (e.g., representing the entirety of a CGR environment, such as 200).

In some embodiments, a process (e.g., OS-level process 302A) executing on a device obtains one or more scene graphs from one or more other processes (e.g., 302B-302D, 304B-304A-304C). In some embodiments, the process renders or updates a CGR environment based on the obtained scene graphs. In this example, process 302A is a centralized process executing (e.g., with OS-level privileges) on device 302 that obtains information for rendering a CGR environment from one or more other processes. OS-level process 302A obtains a scene graph from each of processes 302B-302D. Specifically, process 302A receives a scene graph 308 from process 302B (of App 1), a scene graph 310 from process 302C (of App 2), and a scene graph 312 from process 302D (of App 3).

In some embodiments, a process executing on the device combines two or more obtained scene graphs. For example, OS-level process 302A creates combined scene graph 306 of FIG. 3A based on scene graphs obtained from App 1, App2, and App 3. For instance, combined scene graph 306 includes scene graph node 308A of scene graph 308, scene graph node 310A of scene graph 310, and scene graph node 312A of scene graph 312, among other nodes (e.g., root node 306A). Accordingly, combined scene graph 306 represents a CGR environment (e.g., 200) that includes objects represented by scene graph 308 (tablet computer 206), scene graph 310 (lamp 208), and scene graph 312 (first graphical information overlay 210). In some embodiments, the process that combines the scene graph adds additional data to the scene graph (e.g., position data with respect to a global coordinate system for each application entity).

In some embodiments, a process executing on a device renders the CGR environment based on the combined scene graph. In some embodiments, rendering a CGR environment based on a scene graph includes traversing the scene graph. In some embodiments, traversing a scene graph includes processing (e.g., evaluating) nodes in the scene graph (e.g., node by node) to determine scene data that defines logical and/or spatial representations of the CGR environment. Traversal of a scene graph is well-known to one of skill in the art, and thus is not described in great detail here. For example, traversal generally involves evaluating a first (e.g., arbitrary, or root) node of the scene graph, applying one or more operations based on the data in the scene graph node, and moving through the scene graph hierarchy to evaluate a next node (e.g., moving down a branch evaluating successive nodes until a leaf node is evaluated, or moving up to a next branch in the hierarchy and traversing down until a leaf node is evaluated). In some embodiments, scene graph nodes can be evaluated in any appropriate order. Scene data can include one or more of: property data, behavior data, event data, graphical data, position data, state data, or audio data. In some embodiments, scene data includes other data that can be used to represent a simulated object in a CGR environment. For example, an OS-level process (e.g., 302A) of device 302 can traverse the combined scene graph in order to render a representation of a CGR environment that includes entities form the scene graphs that formed the combined scene graph. In this example, centralized OS process 302A on device 302 renders view 202 of CGR environment 200 shown in FIG. 2 based on the combined scene graph 306. As shown in FIG. 2, view 202 includes tablet computer 206, lamp 208, and first graphical information overlay 210, which are represented by the nodes in combined scene graph 306.

In some embodiments, a process executing on a device obtains one or more scene graph from a process executing on an external device. For example, OS process 302A (of device 302) obtains at least a portion of scene graph 316, which was created by a process 304B executing on device 304. As can be seen in FIG. 3A, combined scene graph 306 includes scene graph node 316A from scene graph 316 (among other nodes from graph 316). In this example, the scene graph obtained from the remote device's 304 process 304A has been combined into the combined scene graph 306. Thus, as can be seen in FIG. 2, view 202 includes a depiction of avatar 212. Avatar 212 is represented by scene graph 316 (App 4 on remote device 304), which was obtained by device 302 (e.g., via connection 320) and combined into scene graph 306.

In some embodiments, an OS-level process executing on a first device communicates with an OS-level process executing on a second, external device to obtain a scene graph. For example, an OS-level process such as 302A is responsible for managing exchange and synchronization of entity data with other shared virtual space session devices (e.g., with device 304 using communication link 320).

In this example, device 304 is also a participant in the CGR session with device 302 to synchronize rendering of CGR environment 200. Thus, as shown in FIG. 3A, OS-level process 304A executing on device 304 also obtains scene graphs from one or more other processes, as described above. For example, OS-level process 304A receives at least a portion of scene graph 308 from process 302B (of App 1, executing on device 302), scene graph 310 from process 302C (of App 2, executing on device 302), scene graph 316 from process 304B (of App 4, executing on device 304), and scene graph 318 from process 304B (of App 5, executing on device 304). As can be seen in FIG. 3A, OS process 304A has combined the obtained scene graphs into combined scene graph 314, which includes scene graph nodes from the obtained scene graphs (e.g., nodes 308A, 316A, 310A, 318A), as well as a root node 314A. Notably, scene graphs 308 and 310 are received from processes executing on an external device 302. In this example, centralized OS-level process 304A on device 304 renders view 204 of CGR environment 200 shown in FIG. 2 based on the combined scene graph 314. As shown in FIG. 2, view 204 includes tablet computer 206, lamp 208, and second graphical information overlay 220, which are represented by the nodes in combined scene graph 314.

Turning now to FIG. 3B, it illustrates detailed views of combined scene graph 306 and combined scene graph 314.

As shown in FIG. 3B, combined scene graph 306 includes at least a portion of scene graphs 308, 310, 312, and 316. In some embodiments, a process that creates a scene graph shares the entire scene graph with a centralized process executing on the same device. In this example, scene graphs 308, 310, and 312 were created by application processes executing on device 302—thus, combined scene graph 306 includes all of the nodes from those scene graphs. In some embodiments, a centralized process executing on a device receives an entire scene graph from a process executing on a remote device. For example, as shown in FIG. 3B, combined scene graph 306 includes all scene graph nodes of scene graph 316 (e.g., as shown in process block 304B of FIG. 3A). In this example, scene graph 316 represents avatar 212 and does not include any portion that is private or withheld from being shared—thus, the full scene graph 316 is shared by device 304 with device 302.

As shown in FIG. 3B, combined scene graph 314 includes the entirety (e.g., all nodes) of scene graphs 316 and 318, which were created by processes executing on the same device 304 as the OS-level process 304A. Combined scene graph 314 also includes a portion of scene graph 308 (from App 1) and scene graph 310 (from App 2).

In some embodiments, a process (e.g., 304A) executing on a device receives only a portion of a scene graph from a process (e.g., 302A) executing on a remote device. For example, combined scene graph 314 includes fewer than all of the nodes of scene graph 308 (as shown in process block 302A of FIG. 3A)—scene graph node 308D is not included in combined scene graph 314. In some embodiments, a portion of a scene graph is designated as non-shareable. Referring briefly to FIG. 3C, which shows a detailed view of scene graph 308 that includes all scene graph nodes, scene graph node 308D is designated as non-shareable content. In this example, node 308D represents a text document displayed on the screen (node 308C) of the tablet computer (308A). In some embodiments, non-shareable content is not shared with external devices. In this example, device 302 does not share node 308D with remote device 304 because it is designated as non-shareable. Accordingly, process 304A of device 304 obtains scene graph 308, but without scene graph node 308D. Thus, as can be seen in view 204 of FIG. 2, tablet computer 206 is visible but the text document is not visible on screen 206A of tablet computer 206 (e.g., the screen in blank). In contrast, the text document is visible in view 202, which is displayed on the device that created the scene graph, device 302.

In some embodiments, content is designated as non-shareable by a process executing on a device. For example, process 302B that created scene graph 308 can designate that the content represented by scene graph node 308D should not be shared with other devices in a shared virtual space session. The process can automatically designate content as non-shareable. In some embodiments, content is designated non-shareable based on user configuration. For example, input received at device 302 can cause data representing content (e.g., an object, or portion thereof) to be designated non-shareable. For further example, the developer of an application can designate certain content created or represented by the application as non-shareable (e.g., a calendar application developer designates meeting information as non-shareable, or a virtual device application developer designates display of any calendar webpage on a virtual device as non-sharable).

In some embodiments, an entire entity is designated as non-shareable. For example, as touched on above, first graphical information overlay 210 (represented by scene graph 312) and second graphical information overlay 220 (represented by scene graph 318) are not shared between devices 302 and 304. In this example, both first graphical information overlay 210 and second graphical information overlay 220 are designated as non-shareable objects (e.g., and thus their scene graphs are non-shareable). Thus, combined scene graph 306 includes scene graph 312, but not scene graph 318; and combined scene graph 314 includes scene graph 318, but not scene graph 312. Accordingly, each device has no knowledge of an entity that has not been shared with it, even if such entity is rendered into a version of the CGR environment by another device in the same session. The result, as shown in FIG. 2, is that device 302 displays first graphical information overlay 210 but not second graphical information overlay 220 in view 202, and device 304 displays second graphical information overlay 220 but not first graphical information overlay 210 in view 204.

In accordance with the techniques above, a device can display a CGR environment (e.g., in a view) that is at least partially synchronized with another, remote device so that the users of each device can experience a shared CGR environment (e.g., and interact with each other, or the same objects). However, certain portions of the CGR environment that exist in the simulation at one device can remain private (e.g., not shared). In this way, a device need only share content (e.g., objects) that will be rendered by an external device, and maintains the ability insert private content into the CGR environment without the external device having any information that the private content exists in the CGR environment rendered at the (local) device, let alone having any information for rendering it.

FIG. 3C illustrates a detailed view of two exemplary scene graphs. As can be seen in FIG. 3C, scene graph 308 includes a root node 308A representing tablet computer 206, a node 308B representing the body of tablet computer 206, and node 308C representing the display screen of tablet computer 206. The root node (e.g., 308A) can include basic information defining an object (e.g., its orientation relative to a global coordinate system, its local coordinate system, etc.). Scene graph 308 also includes node 308D, representing content to be displayed on the screen of the table computer (e.g., the text document), which is designated as non-shareable. In this example, node 308D is a child node of screen node 308C in the scene graph.

FIG. 3C also illustrates scene graph 310, representing lamp 208. As can be seen, scene graph 310 includes a root node 310A representing lamp 208, a node 310B representing the body of lamp 208 (e.g., base and lamp shade), and a node 310D representing the light of lamp 208. Lamp 208 includes a switch 208A, as shown in FIG. 2, which is a user-interactive element that can affect a state of the lamp. In some embodiments, a scene graph includes information regarding a state of a user-interactive visual component of content. For example, the switch 208A is associated with states "ON" and "OFF", and the switch can be toggled (e.g., via user input interaction in the CGR environment 200) between the two states (e.g., as shown in FIG. 4, discussed in more detail below).

Examples of user-interactive states that can be represented by data in a scene graph include: a toggle state (e.g., on, off) of a virtual displayed button or a virtual displayed switch associated with an entity; a virtual displayed option (e.g., a menu, a list having multiple options for selection) associated with an entity; the input state of a virtual displayed input field (e.g., a calculator screen, a text entry field, a document) associated with an entity; a position, within the CGR environment, of an entity (e.g., an object whose position can be changed via user input manipulation); and a displayed appearance of an entity (e.g., an object whose appearance can be changed via user input manipulation). Thus, for example, if state information associated with scene graph node 310C indicates that the switch is in the "OFF" state, it can affect the appearance of the lamp 208 (e.g., switch 208A will appear in the off position, and the light will not be illuminated), and if state information associated with scene graph node 310C indicates that the switch is in the "ON" state, it can affect the appearance of the lamp 208 (e.g., switch 208A will appear in the on position, and the light will be illuminated).

FIG. 4 illustrates exemplary user input interactions with a user-interactive element of an entity in a CGR environment. FIG. 4 includes view 402 of CGR environment 200. In some embodiments, a user-interactive element of an entity is responsive to user input interaction. View 402 is from the perspective of a user avatar 406 that is interacting with a user-interactive element of lamp 208, switch 208A. As can be seen in view 402, avatar 406 has pressed switch 208A (a "rocker switch" in this example) into the "ON" position, thus changing a state associated with lamp 208. The change in state causes the light to illuminate, as shown in view 402. Accordingly, in response to the user interaction, a process responsible for maintaining scene graph 310 (representing lamp 208) will update the scene graph to reflect the changed state information (from "OFF" to "ON"). As described above, scene graphs defining objects can include audio information associated with such objects. For example, data representing an entity that is a virtual dog can include a "barking" sound effect (e.g., played in synchronization with a barking motion). In this example, the state change of the switch from "OFF" to "ON" causes a sound to be played (click sound 408) in response.

As can be seen in view 404, avatar 406 has pressed switch 208A into the "OFF" position, thus changing a state associated with lamp 208. The change in state causes the device to cease displaying the light as illuminated, as shown in view 404. Accordingly, in response to the user interaction, a process responsible for maintaining scene graph 308 (representing lamp 208) will update the scene graph to reflect the changed state information (from "ON" to "OFF"). In this example, the state change of the switch from "ON" to "OFF" also causes a sound to be played (click sound 408) in response.

In some embodiments, a device updates a scene graph and performs a rendering operation based on the updated scene graph in response to a state change. In some embodiments, the device updates display of the CGR environment based on the updated scene graph. For example, in response to the switch 208A being switch to "OFF", the light ceases to be displayed. In some embodiments, a device transmits updated entity data to other devices in a CGR session in response to the state change. For example, after processing a state change of the lamp 208 to "OFF", the device that received the user input device sends results of the change to other devices in order to maintain synchronization of the CGR environment at the other devices. In some embodiments, a state change is transmitted for processing to the application that created the scene graph associated with the corresponding entity. For example, if the user input causing lamp 208 to turn to "OFF" is received at device 304 that is not executing the lamp application (App 2), then device 304 transmits the user input to device 302 for processing by App 2.

In some embodiments, a CGR environment is responsive to input from each electronic device in the CGR session. For example, both devices 302 and 304, which are participating in the synchronized simulation of CGR environment 200, have information (e.g., scene graph 308) that is sufficient to render a representation of lamp 208, including information that identifies that lamp 208 has a user-interactive element (switch 208A) and state information associated with that element. Accordingly, both devices (even the device 304 not executing the application that created lamp 208) know that switch 208A causes a particular state change responsive to user interaction. Thus, user input received at either device can cause manipulation of the user-interactive element, resulting in a change of state. For example, turning back to FIG. 4, the user avatar 406 in either of views 402 and 404 can be either avatar 218 (representing the user of device 302) or avatar 212 (representing the user of device 304). That is, lamp switch 208A is responsive to user input received at either device (e.g., and user input at either device can have the same effect on the lamp). Accordingly, in view 402 avatar 218 can be the avatar that turns the lamp on, while in view 404 avatar 212 can be the avatar that turns the lamp off (or vice versa).

In some embodiments, a process executing on a device is responsible for maintaining the state information associated with a scene graph. For example, lamp 208 is represented by scene graph 310. In this example, App 2 created scene graph 310 and a process of that application (e.g., process 302C) is responsible for maintaining the scene graph. In some embodiments, maintaining a scene graph includes processing user-interactions with an entity represented by the scene graph. For example, the user input representing a change of the switch 208A in FIG. 4 (e.g., to the ON or OFF position) is forwarded to the process 302C of App 2. In some embodiments, a process that maintains a scene graph processes user input the same regardless of whether user input is received at a local device or from a remote device. For example, in the situation where avatar 212 (responsive to user input received at an input device of device 304) causes a change to switch 208A, the process 302C of App 2 processes the input the same as if the input had come from an input device (e.g., a button) of the device 302 on which the process 302C of App 2 is being executed. In this example, App 2 is not executed on device 304, and thus device 304 communicates the user input to application App 2 on device 302 for processing (e.g., to determine the response to the user input based on the application's logic).

In some embodiments, a process is not provided information regarding whether user input causing a state change originated from a local device or a remote device. For example, centralized OS-level process 302A can be aware that input was received at device 304 (e.g., because it manages receiving such data via communication link 320), however process 302A passes the input along to App 2 without an indication that the input was received at an external device 304. Controlling what is shared by a centralized process with individual applications has several potential benefits. First, an application (e.g., App 2) does not have to be made aware that it is currently in a multi-device shared virtual space session, or that the application's content is being synchronized with one or more external devices. This can provide added security and privacy because an application (e.g., for adding a lamp to a CGR environment) is not provided information about the state of the device, or the existence or identity of any remote devices or users. Second, the creation of an application (e.g., App 2) can be simplified, as the application does not need to include any functions specific to supporting or handling a multi-device session, such as the ability to resolve and handle conflicts between user input from potentially multiple sources (e.g., devices, users). Thus, App 2 can be dedicated to simply creating a representation of a lamp, and the developer of the application does not need to include functions related to synchronizing the state of said lamp across multiple devices. Third, because a centralized OS-level process receives the necessary data for rendering an entity and information about user-interactive properties of the entity, an application that sources the entity does not need to perform physics simulations for processing interactions (e.g., it does not need to perform hit-testing to determine whether user input has interacted with the object).

In some embodiments, a CGR session includes more than two devices. In the example described above, two devices (e.g., 302 and 304) are connected and synchronizing content for rendering in a CGR environment. However, three or more devices can be connected and participating in a CGR session. For example, a third device can connect to devices 302 and 304, obtain scene graphs from those devices (e.g., graph 308 and graph 316), provide one or more scene graphs to devices 302 and 304 (e.g., representing a third avatar for the user of the third device), and render and display a representation of CGR environment 200, in accordance with the example techniques described above. As described above, the CGR environment 200 would be responsive to user input received at the third device (e.g., can be used to manipulate objects, such as switch 208A of lamp 208).

In some embodiments, each device in a CGR session is connected to each other. For example, if a CGR session included three devices, each device would maintain a connection to the other two devices (e.g., for communicating synchronization data). An appropriate communication protocol (e.g., TCP/IP) for establishing and/or maintaining a connection allowing transmission of data between devices can be used. In some embodiments, at least one device in a CGR session is not directly connected to another device. For example, one device can act as a bridge between two other devices, where all three devices are connected and participating in the CGR session.

4. Identification of Devices in a CGR Session, and Communication Addressing

In some embodiments, devices in a CGR session communicate using alphanumeric identifiers for nodes in a session. As described herein, an alphanumeric identifier is referred to as a "peerID". In some embodiments, a node is a process (e.g., OS-level or application-level) executing on a device. Thus, for example, a node can be an application-level process and have a peerID associated with it, while an OS-level process of the same device has a different peerID associated with it. In this way, a process executing on any device can send addressed communication to a process executing on the same or another device in the same CGR session.

Techniques for generating a peerID are discussed below, and are provided merely as examples. Other techniques can be used to generate peerIDs that are usable to uniquely identify nodes in a session. In some embodiments, a peerID is a numeric identifier that uniquely identifies a networked node within the session it belongs to. Different sessions can generate peerIDs in different ranges defined by bitmasks. For example, the bitmask range is defined when a session is created and does not change throughout the lifetime of the session. This allows for fast matching with what session a peerID belongs to, and provides a fast routing mechanism between sessions. A session, for example, is a collection of processes. For example, a first session (Session A) can be collection of processes executing on a device that involve locally executing applications and OS-level processes that collect and render the CGR environment (e.g., one or each device in the CGR session executing the processes of Session A). A second session (Session B) can include processes (e.g., OS-level) on all devices in a CGR session that manage communication between the devices in the CGR session (e.g., each device executing a Session B process that manages synchronization and data transfer over a communication link). In some embodiments, the devices negotiate and/or determine the peerIDs that will identify one or more sessions when connecting to each other (e.g., establishing a shared virtual space session).

As an example, Session A can use peerID bitmask range 0x0000FFFF, and Session B can use peerID bitmask range 0xFFFF0000. Session A will generate peerIDs as follows: 0x00000001, 0x00000002, 0x00000003, 0x00000004 . . . 0x0000FFFF. Session B will generate peerIDs as follows: 0x00010000, 0x00020000, 0x00030000, 0x00040000 . . . 0xFFFF0000. Thus, in this example, the first two nodes in Session A will be assigned peerIDs 0x00000001 and 0x00000002 (respectively). Further, in this example, the first two nodes in Session B will be assigned peerIDs 0x00010000 and 0x00020000 (respectively).

In some embodiments, a node can address a communication to another node (e.g., in the same session or a different session). Continuing with the example above, if the first node in Session A (0x00000001) wanted to send communication to the second node (0x00000002) in Session A, it would address such communication to the peerID (0x00000002). For example, the communication can be handled by an OS-level process. In some embodiments, nodes can communicate between sessions. Thus, for example, Session A could be operating on both a first device (e.g., device 302) and a second device (304), and thus the nodes of Session A are replicated on both devices (e.g., represent application data being synchronized between the two devices in the CGR session), or the second node 0x00000002 can be executing on the second device only, but included in Session A on the second device. Further, as described above, the Session B nodes (e.g., node 0x00010000 on the first device, and node 0x00020000 on the second device) can be OS-level processes that form the connection for communication between the two devices. Accordingly, if the first node in Session A (0x00000001) wanted to send communication to the second node (0x00000002) in Session A on the second device, it would address such communication to the peerID (0x00020002). The peerID 0x00020002 is a combination of the two peerIDs 0x00020000 and 0x00000002, and represents the route to the destination node: first travelling through node 0x00020000, and then to node 0x00000002.

In some embodiments, a routing layer in a process executing on a device performs routing of communications. For example, a routing layer in an OS-level process or in an application-level process connects separate sessions within one process, does translation (if needed) between peerIDs when data is crossing border between separate sessions, and does security or other rules check on session border crossing. Whenever a session receives data that is targeted for a node that it does not have knowledge of (does not match with its bitmask), the device delegates responsibility for routing the data (to the correct session) to an instance of a routing layer. In some embodiments, a routing layer is an OS-level process routing layer. In some embodiments, an OS-level process routing layer routes data between local applications (e.g., executing on the same device as the OS-level process) and the OS-level process (e.g., a shared virtual space session). In some embodiments, a routing layer is an application-level routing layer. In some embodiments, an application-level routing layer is executing as part of an application process, and routes data from the application to the OS-level process (e.g., scene graph data).

5. Ownership Model of Entities in a CGR Environment

As described above, two or more networked devices perform replication of a CGR session through synchronization of a scene graph (also referred to as an entity graph) representing an entity (e.g., an object). In some embodiments, each node in the networked session is capable of creating and modifying certain subset of an entity graph. For example, as described above, a remote device obtains information for creating a representation of an entity in a CGR environment (e.g., a scene graph), including information about user-interactive characteristics of that entity. Thus, the remote device can receive user input that causes state changes to the entity, even though the entity was created by an application executing on another device. In some embodiments, changes to an entity (e.g., due to user interaction or interaction between entities in the CGR environment) using an ownership model that includes one or more of "weak" ownership and "strong" ownership states of an entity.

In some embodiments, every entity (e.g., in a CGR environment) at every point in time has only one networked peer that is authoritative of changing its state to avoid conflicts. For example, this makes conflict resolution simple—if multiple updates are received for the same entity from different nodes, the update from the current owner of the entity is applied and all other attempts to update the entity state are discarded.

In some embodiments, a node is able to take over control of an object from another node. This model requires a system to resolve conflict resolution in state updates produced by multiple participants in the CGR session, as well as prevent security issues if a certain participant is trying to update an object that they should not be capable of modifying.

In some embodiments, there are multiple levels of ownership that a participant (e.g., device) can have over an entity. In some embodiments, a device has weak ownership of an entity. In some embodiments, weak ownership means that even though an entity is currently owned by some participant, such ownership can be overtaken at any moment by another peer. For example, a participant device can take ownership of an entity and update a state of the entity at any time (e.g., on all devices in the CGR session, by transmitting such update to other devices to cause those devices to apply the update based on proper ownership). In some embodiments, in response to receiving a change to an entity (e.g., that has been taken over), a device transmits synchronization data (e.g., a state synchronization message that reflects the change) to one or more other devices in the same CGR session. In some embodiments, if the synchronization data conflicts with another participant's changes, the entity state will be reconciled by recipient devices automatically. For example, a device that receives conflicting updates will only apply the update based on a timestamp or integer token associated with each participant's change request.

In some embodiments, a device can request ownership (e.g., from the current owner, or from all devices in a media session). In some embodiments, a current owner of an entity can pass ownership directly to a specific device (e.g., without being intercepted).

In some embodiments, a state synchronization message (e.g., between participants) includes a token (e.g., an integer) that represents a current version of the entity. In some embodiments, a receiver of the state synchronization message saves this token for each entity synchronization it receives. In some embodiments, every time a participant overtakes ownership of an entity it, increments the token. In some embodiments, state updates with a token smaller than the currently known token are discarded by the receiving participant.

In some embodiments, a device has strong ownership of an entity. In some embodiments, when a participant acquires strong ownership over the entity, no other participant in the session is able to take authority over the entity, send updates, or apply updates to this entity that do not come from the "strong owner". In some embodiments, 7 an ownership change to strong ownership or a change to weak ownership by the strong owner includes broadcasting (e.g., by the device whose ownership is changing) a message to all other devices of the change in ownership. In some embodiments, the participant that has strong ownership over the entity is able to downgrade his ownership to weak.

To illustrate the concept of weak and strong ownership, consider the example of a box in a CGR environment being picked up. Initially, the box is weakly owned by one of a CGR session participants (e.g., a first device). Then, a second device acquires strong ownership over the box (e.g., user of second device picks up the box using an avatar). Then, the second device downgrades his authority over the box to weak, and applies a physics impulse to the box (e.g., the avatar throws the box in the CGR environment). At this point any participant in the shared virtual environment can retake ownership, as the box is now weakly owned. in some embodiments, weak ownership defaults back to the device on which the application that created the entity (e.g., the box) is executing. Finally, a third device acquires strong ownership over the box (e.g., an avatar from a third device picks up the box).

In some embodiments, ownership of an entity migrates after a current owner leaves a CGR session. In some embodiments, an entity is associated with a migration policy. For example, if the current owner of an entity leaves a CGR session (e.g., disconnects from a shared virtual space session), then a migration policy can determine which remaining participant becomes the owner. In some embodiments, the migration policy migrates with the entity.

Using the ownership model described above can allow a device in a CGR session to: freely pick up a placed entity around the CGR environment smoothly with no visible lag (if current owner does not forbid to do so), hold authority of an entity and not give it away to another device, hand off an entity to another specific shared virtual space participant without the rest of participants being able to intercept, and explicitly request that another participant hand off entity to them. The ownership model can also allow a picked up entity to be thrown, and after that another participant is able to pick it up. Further, the ownership model can also allow, and after a shared virtual space participant is disconnected: some of the participant device's entities vanish upon disconnection by the device, and/or stay in the world and either become available for any user to pick up or explicitly transfer ownership to a specific participant.

Figure 5:
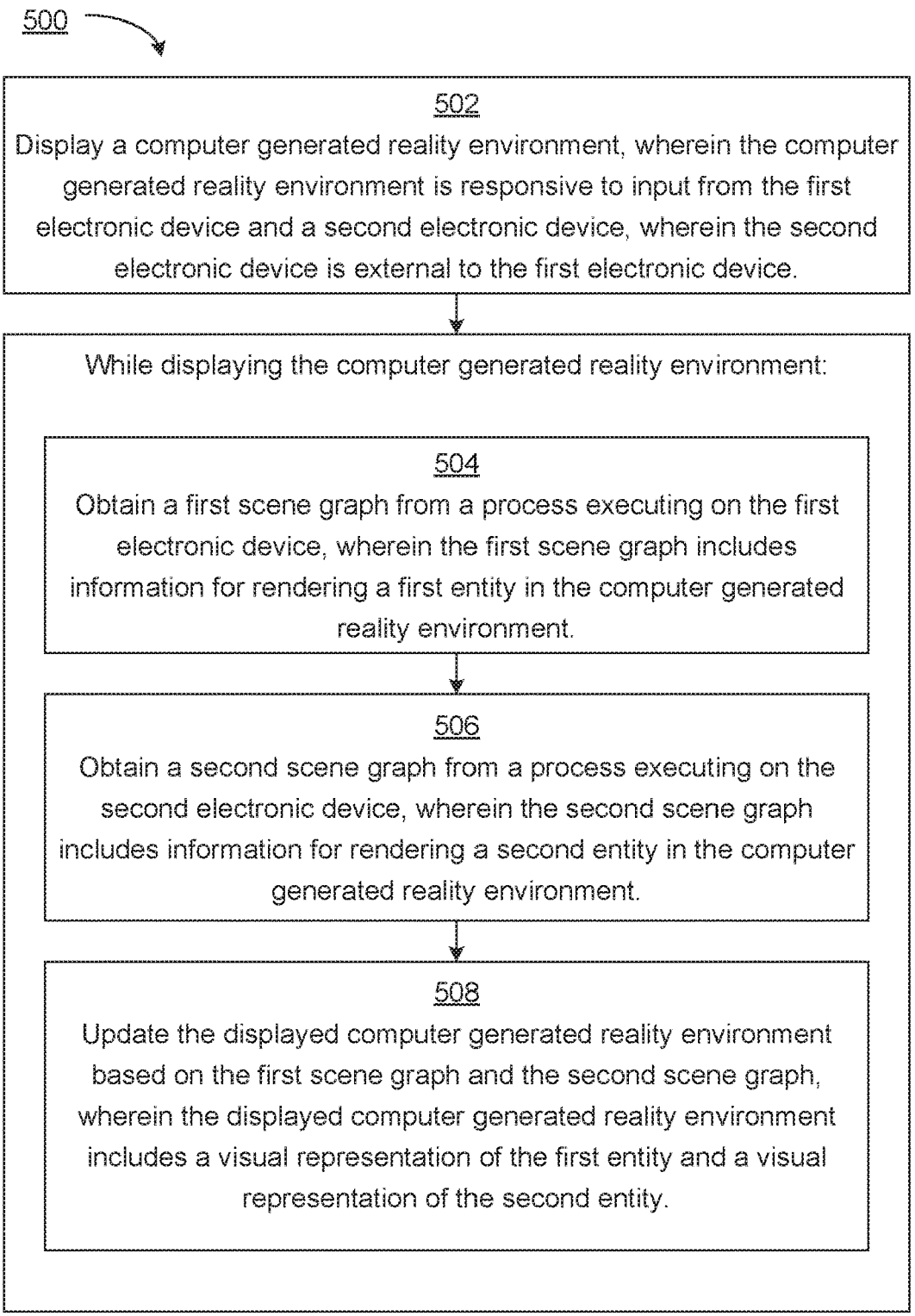
FIG. 5 illustrates a flow diagram illustrating a method of providing a multi-user computer generated reality environment in accordance with some embodiments.

FIG. 5 is a flow diagram illustrating a method for providing a multi-user computer generated reality environment. Method 500 is performed at system that includes a first electronic device (e.g., 100a, 100b, 100c, 302). In some embodiments, one or more of the first electronic device or the second electronic device is a HUD device or a HMD device. Some operations in method 500 are, optionally, combined, the orders of some operations are, optionally, changed, and some operations are, optionally, omitted.

At block 502, the first electronic device displays a computer generated reality environment (e.g., 200), wherein the computer generated reality environment is responsive to input from the first electronic device and a second electronic device (e.g., device 304), wherein the second electronic device is external to the first electronic device. For example, user input received at either of the first or second electronic devices can cause interaction with (e.g., manipulation of) entities (e.g., virtual objects) in the computer generated reality environment. In some embodiments, the first electronic device and the second electronic device are network connected At block 504, while displaying the computer generated reality environment, the first electronic device obtains a first scene graph (e.g., graph 308) from a process (e.g., process 302B) executing on the first electronic device, wherein the first scene graph includes information for rendering a first entity (e.g., tablet computer 206) in the computer generated reality environment. In some embodiments, a scene graph (e.g., the first scene graph) includes information for rendering one or more entities (e.g., in a computer generated reality environment). In some embodiments, an entity is an object in a virtual world. In some embodiments, information for rendering an entity is included in a data object (e.g., a CGR data object) representing the entity. In some embodiments, data representing an entity (e.g., a data object, scene graph) is transmitted and/or synchronized between two or more devices. In some embodiments, the first scene graph is created by an application-level process executing on the first electronic device. In some embodiments, the first scene graph is created by an OS-level process executing on the first electronic device.

At block 506, while displaying the computer generated reality environment, the first electronic device obtains a second scene graph (e.g., graph 316) from a process (e.g., process 304C) executing on the second electronic device, wherein the second scene graph includes information for rendering a second entity (e.g., avatar 212) in the computer generated reality environment. In some embodiments, the second scene graph is created by an application-level process executing on the second electronic device. In some embodiments, the second scene graph is created by an OS-level process executing on the second electronic device.

At block 508, while displaying the computer generated reality environment, the first electronic device updates the displayed computer generated reality environment based on the first scene graph and the second scene graph, wherein the displayed computer generated reality environment includes a visual representation of the first entity (e.g., tablet computer 206 in view 202 of FIG. 2) and a visual representation of the second entity (e.g., avatar 212 in view 202 of FIG. 2). In some embodiments, updating a displayed computer generated reality environment based on a scene graph includes traversing the scene graph, and updating the displayed computer generated reality environment based on the result of the traversal. In some embodiments, traversing a scene graph includes rendering a display of one or more entities based on the scene graph.

In some embodiments, the first electronic device transmits the first scene graph to the second electronic device (e.g., to the process executing on the second device from which the second scene graph was obtained, such as an OS-level process of the second device).

In some embodiments, the first scene graph includes information (e.g., 308B of FIG. 3C) for rendering first visual content (e.g., body of tablet computer 206) in the computer generated reality environment (e.g., a shareable portion of the first entity, or another entity different than the first entity) and information (e.g., 308D of FIG. 3C) for rendering second visual content (e.g., text document) in the computer generated reality environment different than the first visual content (e.g., a non-shareable portion of the first entity, or another entity different than the first). In some embodiments, transmitting the first scene graph to the second electronic device comprises transmitting the information for rendering the first visual content in the computer generated reality environment to the second electronic device without transmitting the information for rendering the second visual content in the computer generated reality environment to the second electronic device. For example, a shareable entity or portion thereof is transmitted, but a non-shareable entity or portion thereof is not transmitted. In some embodiments, the displayed computer generated reality environment includes a visual representation of the first visual content in the computer generated reality environment and a visual representation of the second visual content in the computer generated reality environment. For example, non-shareable visual content is not shared with the second electronic device, but is rendered into the environment displayed at the first device.

In some embodiments, the first scene graph including the first visual content and the second visual content were created by the process (e.g., 302A or 302B) executing on the first electronic device. For example, the process executing on the first electronic device creates the scene graph that includes both shareable and non-shareable content.

In some embodiments, obtaining the first scene graph comprises obtaining an indication, from the process (e.g., 302B) executing on the first electronic device, that the second visual content is non-shareable (e.g., can be specified by the developer of an application associated with the process). In some embodiments, transmitting the first scene graph to the second electronic device comprises transmitting the first scene graph based at least in part on the indication that the second visual content is non-shareable (e.g., excluding visual content designated as non-shareable).

In some embodiments, the first visual content and the second visual content are associated with the first entity (e.g., a portion of the first entity is non-shareable, and a portion of the first entity is shareable), and wherein the information for rendering the first entity includes the information for rendering the first visual content and the information for rendering the second visual content.

In some embodiments, the first electronic device combines, in a third scene graph (e.g., 306), the first scene graph and the second scene graph, wherein the third scene graph includes information for rendering the computer generated reality environment (e.g., environment 200). In some embodiments, updating the displayed computer generated reality environment based on the first scene graph and the second scene graph comprises updating the displayed computer generated reality environment based on the third scene graph (e.g., traversing the third scene graph and rendering the resulting scene).

In some embodiments, the process (e.g., 302B) executing on the first electronic device is a process of an application executing on the first electronic device. In some embodiments, combining the first scene graph and the second scene graph comprises combining, by a process (e.g., 302A) of an operating system of the first electronic device, the first scene graph and the second scene graph (e.g., an application provides the scene graph, and OS-level process combines it with the remotely-created scene graph). In some embodiments, updating the displayed computer generated reality environment based on the third scene graph comprises updating, by the process of the operating system of the first electronic device, the displayed computer generated reality environment based on the third scene graph.

In some embodiments, the process (e.g., 302B) executing on the first electronic device is a first process (e.g., of a first application) executing on the first electronic device. In some embodiments, the first electronic device obtains a fourth scene graph (e.g., that includes information for rendering one or more entities) (e.g., 310) from a second process (e.g., of a second application) (e.g., 302C) executing on the first electronic device, wherein the fourth scene graph includes information for rendering a third entity (e.g., lamp 208) in the CGR environment. In some embodiments, the first electronic device combines, in the third scene graph (e.g., 306), the first scene graph (e.g., 308), the second scene graph (e.g., 316), and the fourth scene graph (e.g., 310). In some embodiments, the first electronic device updates the displayed computer generated reality environment (e.g., view 202 of environment 200 as shown in FIG. 2) based on the third scene graph, wherein the displayed computer generated reality environment includes a visual representation of the third entity (e.g., lamp 208 in view 202 of FIG. 2).

In some embodiments, the second entity (e.g., an object capable of being interacted with, such as a switch, a button, or something that can otherwise be physically manipulated) (e.g., a lamp with a switch) includes a user-interactive visual component, and wherein obtaining the second scene graph includes obtaining information regarding a state of the user-interactive visual component. For example, the first electronic device knows that the second entity includes a user-interactive element, even though the second entity was created by an application executing on the second device and such corresponding application may not be installed on the first device. In some embodiments, while displaying the computer generated reality environment that includes the visual representation of the second entity, the first electronic device receives, from an input device of the first electronic device, data representing a user input interaction, in the computer generated reality environment, with the displayed second entity, wherein the user input interaction with the displayed second entity represents a change to the state of the user-interactive visual component of the second entity. In some embodiments, in response to receiving the data representing the user input interaction with the second entity, the first electronic device transmits the data representing the user input interaction with the second entity to the second electronic device (e.g., transmits an indication of the state change, such as a toggle of a switch; or transmits the user input action, such as physical manipulation). In some embodiments, subsequent to transmitting the data representing the user input interaction with the second entity to the second electronic device, the first electronic device obtains, from the second electronic device, an update to (e.g., a change to, or a replacement of) the second scene graph based on the user input interaction with the displayed second entity representing the change to the state of the user-interactive visual component of the second entity. In some embodiments, the first electronic device updates the displayed computer generated reality environment based on the updated second scene graph.

In some embodiments, the change to the state of the user-interactive visual component (e.g., of the second entity) represents one or more of the following: a change to a toggle state of a virtual displayed button or a virtual displayed switch associated with the second entity; selection of a virtual displayed option (e.g., a menu, a list having multiple options for selection) associated with the second entity; input into a virtual displayed input field (e.g., a calculator screen, a text entry field, a document) associated with the second entity; a change to a position, within the computer generated reality environment, of the second entity; and a change to a displayed appearance of the second entity.

In some embodiments, the first entity (e.g., an object capable of being interacted with, such as a switch, a button, or something that can otherwise be physically manipulated)

(e.g., where the first entity is lamp 208, represented by graph 310) includes a user-interactive visual component (e.g., switch 208A), and wherein the first scene graph includes information regarding a state of the user-interactive visual component. In some embodiments, while displaying the computer generated reality environment that includes the visual representation of the first entity, receiving (e.g., from the first or second electronic device) data representing a user input (e.g., via an input device of the second device) interaction, in the computer generated reality environment, with the first entity, wherein the user input interaction with the first entity represents a change to the state of the user-interactive visual component of the first entity. For example, FIG. 4 shows an interaction of avatar 406 (controlled by user input) in environment 200 representing manipulation of switch 208A of lamp 208. In some embodiments, in response to receiving the user input interaction with the first entity, the first electronic device: updates (e.g., by an application process or by an OS-level process) the first scene graph based on the user input interaction with the first entity representing a change to the state of the user-interactive visual component of the first entity; and updates (e.g., by an OS-level process) the displayed computer generated reality environment based on the updated first scene graph.

In some embodiments, receiving the data representing the user input interaction with the first entity comprises receiving, from the second electronic device, the data representing the user input interaction with the first entity (e.g., the user input interaction represents user input received at a user input device of the second electronic device).

In some embodiments, the user input interaction with the first entity received from the second electronic device is a first user input interaction with the first entity. In some embodiments, while displaying the computer generated reality environment that includes the visual representation of the first entity, the first electronic device receives, from an input device of the first electronic device, data representing a second user input interaction, in the computer generated reality environment, with the first entity, wherein the second user input interaction with the first entity represents a change to the state of the user-interactive visual component of the first entity. In some embodiments, in response to receiving the second user input interaction with the first entity, the first electronic device: updates (e.g., by an application process or by an OS-level process) the first scene graph based on the second user input interaction with the first entity representing a change to the state of the user-interactive visual component of the first entity; and updates the displayed computer generated reality environment based on the updated first scene graph (e.g., to change appearance of lamp 208 to ON or OFF, as appropriate based on the state change).

In some embodiments, the process (e.g., 302B) executing on the first electronic device is a process of an application executing on the first electronic device. In some embodiments, the first electronic device passes, by a process of an operating system (e.g., 302A) of the first electronic device, the data representing the first user input interaction to the process of the application without an indication that the data representing the first user input interaction was received from the second electronic device (e.g., application is made not aware that the input came from a remote device). In some embodiments, the first electronic device passes, by the process of the operating system of the first electronic device, the data representing the second user input interaction to the process of the application without an indication that the data representing the second user input interaction was received from an input device of the first electronic device (e.g., application is made not aware that the input came from a local input device).

In some embodiments, further in response to receiving the user input interaction with the first entity, the first electronic device transmits the updated first scene graph to the second electronic device.

In some embodiments, the process (e.g., 302B) executing on the first electronic device is a process of an application executing on the first electronic device, and the process of the application executing on the first electronic device is responsible for maintaining the first scene graph (e.g., the first scene graph was created by the process of the application executing on the first electronic device). In some embodiments, the first electronic device receives, by a process (e.g., 302A) of an operating system of the first electronic device, the data representing the user input interaction with the first entity from the second electronic device. In some embodiments, the first electronic device passes, by the process of the operating system of the first electronic device, the data representing the user input interaction with the first entity received from the second electronic device to the process of the application executing on the first electronic device. In some embodiments, the first electronic device updates, by the process of the application executing on the first electronic device, the first scene graph based on the data representing the user input interaction with the first entity received from the second electronic device. In some embodiments, the first electronic device receives, by the process of the operating system of the first electronic device, the updated first scene graph from the process of the application executing on the first electronic device.

In some embodiments, the second electronic device attained strong ownership (e.g., exclusive right to modify a state of the entity, as between devices in the session) of the first entity in response to the user input interaction with the first entity. In some embodiments, subsequent to receiving the data representing the user input interaction with the first entity from the second device, and while displaying the computer generated reality environment that includes the visual representation of the first entity, the first electronic device: receives, from a third electronic device, data representing a user input (e.g., via an input device of the third device) interaction, in the computer generated reality environment, with the first entity representing a change to the state of the user-interactive visual component of the first entity (e.g., a change that conflicts with the user input interaction from the second device). In some embodiments, in response to receiving the data representing the user input interaction with the first entity from the third electronic device, the first electronic device: in accordance with a determination that an electronic device other than the third device has strong ownership of the first entity, discards the data representing the user input interaction with the first entity received from the third electronic device; and in accordance with a determination that no electronic device has strong ownership of the first entity (e.g., a device has weak ownership, which can be taken over by any device, such as the third device), updates (e.g., by an application process or by an OS-level process) the first scene graph based on the data representing the user input interaction with the first entity received from the third electronic device.

In some embodiments, further in accordance with a determination that an electronic device other than the third device has strong ownership of the first entity, the first electronic device transmits, to the third electronic device, the first scene graph updated based on the user input interaction with the first entity received from the second electronic device.

In some embodiments, the change to the state of the user-interactive visual component (e.g., of the first entity) represents one or more of the following: a change to a toggle state of a virtual displayed button or a virtual displayed switch associated with the first entity; selection of a virtual displayed option (e.g., a menu, a list having multiple options for selection) associated with the first entity; input into a virtual displayed input field (e.g., a calculator screen, a text entry field, a document) associated with the first entity; a change to a position, within the computer generated reality environment, of the first entity; and a change to a displayed appearance of the first entity.

In some embodiments, one or more of the first entity and the second entity is a user avatar (e.g., a three-dimensional representation of a user of the respective device that moves in accordance with user input received at the respective device).

In some embodiments, one or more scene graphs, of the first scene graph and the second scene graph, includes information for outputting audio associated with the respective first or second entity. In some embodiments, while displaying the computer generated reality environment, the first electronic device outputs audio, via an audio output device of the first electronic device, in accordance with the information for outputting audio in the one or more scene graphs, wherein outputting audio comprises synchronizing audio output with at least one visual property (e.g., movement, collision) of the computer generated reality environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and embodiments have been fully described with reference to the accompanying drawings, it is to be noted that various changes and modifications will become apparent to those skilled in the art. Such changes and modifications are to be understood as being included within the scope of the disclosure and embodiments as defined by the claims.

What is claimed is:

1. An electronic device, comprising:
one or more processors; and
memory storing one or more programs configured to be executed by the one or more processors, the one or more programs including instructions for:
displaying a computer generated reality environment, wherein the computer generated reality environment is responsive to input from the electronic device and a second electronic device, wherein the second electronic device is external to the electronic device;
while displaying the computer generated reality environment:
obtaining a first scene graph from a process executing on the electronic device, wherein the first scene graph includes information for rendering a first entity in the computer generated reality environment;
obtaining a second scene graph from a process executing on the second electronic device, wherein the second scene graph includes information for rendering a second entity in the computer generated reality environment; and
updating the displayed computer generated reality environment based on the first scene graph and the second scene graph, wherein the displayed computer generated reality environment includes a visual representation of the first entity and a visual representation of the second entity.

2. The device of claim 1, the one or more programs further including instructions for:
transmitting the first scene graph to the second electronic device;
wherein the first scene graph includes information for rendering first visual content in the computer generated reality environment and information for rendering second visual content in the computer generated reality environment different than the first visual content;
wherein transmitting the first scene graph to the second electronic device comprises transmitting the information for rendering the first visual content in the computer generated reality environment to the second electronic device without transmitting the information for rendering the second visual content in the computer generated reality environment to the second electronic device; and
wherein the displayed computer generated reality environment includes a visual representation of the first visual content in the computer generated reality environment and a visual representation of the second visual content in the computer generated reality environment.

3. The device of claim 2, wherein:
the first scene graph including the first visual content and the second visual content were created by the process executing on the first electronic device;
obtaining the first scene graph comprises obtaining an indication, from the process executing on the first electronic device, that the second visual content is non-shareable; and
transmitting the first scene graph to the second electronic device comprises transmitting the first scene graph based at least in part on the indication that the second visual content is non-shareable.

4. The device of claim 1, wherein the process executing on the first electronic device is a process of an application executing on the first electronic device, the one or more programs further including instructions for:
combining, in a third scene graph by a process of an operating system of the first electronic device, the first scene graph and the second scene graph; and
wherein updating the displayed computer generated reality environment based on the first scene graph and the second scene graph comprises updating, by the process of the operating system of the first electronic device, the displayed computer generated reality environment based on the third scene graph.

5. The device of claim 1, wherein the second entity includes a user-interactive visual component, and wherein obtaining the second scene graph includes obtaining information regarding a state of the user-interactive visual component, the one or more programs further including instructions for:
while displaying the computer generated reality environment that includes the visual representation of the second entity, receiving, from an input device of the first electronic device, data representing a user input interaction, in the computer generated reality environment, with the displayed second entity, wherein the user input interaction with the displayed second entity represents a change to the state of the user-interactive visual component of the second entity;

in response to receiving the data representing the user input interaction with the second entity, transmitting the data representing the user input interaction with the second entity to the second electronic device;

subsequent to transmitting the data representing the user input interaction with the second entity to the second electronic device, obtaining, from the second electronic device, an update to the second scene graph based on the user input interaction with the displayed second entity representing the change to the state of the user-interactive visual component of the second entity; and updating the displayed computer generated reality environment based on the updated second scene graph.

6. The device of claim 1, wherein the first entity includes a user-interactive visual component, and wherein the first scene graph includes information regarding a state of the user-interactive visual component, the one or more programs further including instructions for:

while displaying the computer generated reality environment that includes the visual representation of the first entity, receiving data representing a user input interaction, in the computer generated reality environment, with the first entity, wherein the user input interaction with the first entity represents a change to the state of the user-interactive visual component of the first entity; and in response to receiving the user input interaction with the first entity:
updating the first scene graph based on the user input interaction with the first entity representing a change to the state of the user-interactive visual component of the first entity; and
updating the displayed computer generated reality environment based on the updated first scene graph.

7. The device of claim 6, wherein the data representing the user input interaction with the first entity is received from the second electronic device, and wherein the user input interaction with the first entity received from the second electronic device is a first user input interaction with the first entity, the one or more programs further including instructions for:

while displaying the computer generated reality environment that includes the visual representation of the first entity, receiving, from an input device of the first electronic device, data representing a second user input interaction, in the computer generated reality environment, with the first entity, wherein the second user input interaction with the first entity represents a change to the state of the user-interactive visual component of the first entity; and in response to receiving the second user input interaction with the first entity:
updating the first scene graph based on the second user input interaction with the first entity representing a change to the state of the user-interactive visual component of the first entity; and
updating the displayed computer generated reality environment based on the updated first scene graph.

8. The device of claim 7, wherein the process executing on the first electronic device is a process of an application executing on the first electronic device, the one or more programs further including instructions for:

passing, by a process of an operating system of the first electronic device, the data representing the first user input interaction to the process of the application without an indication that the data representing the first user input interaction was received from the second electronic device; and passing, by the process of the operating system of the first electronic device, the data representing the second user input interaction to the process of the application without an indication that the data representing the second user input interaction was received from an input device of the first electronic device.

9. The device of claim 7, wherein the second electronic device attained strong ownership of the first entity in response to the user input interaction with the first entity, the one or more programs further including instructions for:

subsequent to receiving the data representing the user input interaction with the first entity from the second device, and while displaying the computer generated reality environment that includes the visual representation of the first entity:

receiving, from a third electronic device, data representing a user input interaction, in the computer generated reality environment, with the first entity representing a change to the state of the user-interactive visual component of the first entity; and in response to receiving the data representing the user input interaction with the first entity from the third electronic device:
in accordance with a determination that an electronic device other than the third device has strong ownership of the first entity, discarding the data representing the user input interaction with the first entity received from the third electronic device; and
in accordance with a determination that no electronic device has strong ownership of the first entity, updating the first scene graph based on the data representing the user input interaction with the first entity received from the third electronic device.

10. The device of claim 1, wherein one or more scene graphs, of the first scene graph and the second scene graph, includes information for outputting audio associated with the respective first or second entity, the one or more programs further including instructions for:

while displaying the computer generated reality environment, outputting audio, via an audio output device of the first electronic device, in accordance with the information for outputting audio in the one or more scene graphs,
wherein outputting audio comprises synchronizing audio output with at least one visual property of the computer generated reality environment.

11. A non-transitory computer-readable storage medium storing one or more programs configured to be executed by one or more processors of a first electronic device, the one or more programs including instructions for:

displaying a computer generated reality environment, wherein the computer generated reality environment is responsive to input from the first electronic device and a second electronic device, wherein the second electronic device is external to the first electronic device;

while displaying the computer generated reality environment:
obtaining a first scene graph from a process executing on the first electronic device, wherein the first scene graph includes information for rendering a first entity in the computer generated reality environment;

obtaining a second scene graph from a process executing on the second electronic device, wherein the second scene graph includes information for rendering a second entity in the computer generated reality environment; and updating the displayed computer generated reality environment based on the first scene graph and the second scene graph, wherein the displayed computer generated reality environment includes a visual representation of the first entity and a visual representation of the second entity.

12. The non-transitory computer-readable storage medium of claim 11, the one or more programs further including instructions for:

transmitting the first scene graph to the second electronic device;

wherein the first scene graph includes information for rendering first visual content in the computer generated reality environment and information for rendering second visual content in the computer generated reality environment different than the first visual content;

wherein transmitting the first scene graph to the second electronic device comprises transmitting the information for rendering the first visual content in the computer generated reality environment to the second electronic device without transmitting the information for rendering the second visual content in the computer generated reality environment to the second electronic device; and wherein the displayed computer generated reality environment includes a visual representation of the first visual content in the computer generated reality environment and a visual representation of the second visual content in the computer generated reality environment.

13. The non-transitory computer-readable storage medium of claim 12, wherein:

the first scene graph including the first visual content and the second visual content were created by the process executing on the first electronic device;

obtaining the first scene graph comprises obtaining an indication, from the process executing on the first electronic device, that the second visual content is non-shareable; and transmitting the first scene graph to the second electronic device comprises transmitting the first scene graph based at least in part on the indication that the second visual content is non-shareable.

14. The non-transitory computer-readable storage medium of claim 11, wherein the process executing on the first electronic device is a process of an application executing on the first electronic device, the one or more programs further including instructions for:

combining, in a third scene graph by a process of an operating system of the first electronic device, the first scene graph and the second scene graph; and wherein updating the displayed computer generated reality environment based on the first scene graph and the second scene graph comprises updating, by the process of the operating system of the first electronic device, the displayed computer generated reality environment based on the third scene graph.

15. The non-transitory computer-readable storage medium of claim 11, wherein the second entity includes a user-interactive visual component, and wherein obtaining the second scene graph includes obtaining information regarding a state of the user-interactive visual component, the one or more programs further including instructions for:

while displaying the computer generated reality environment that includes the visual representation of the second entity, receiving, from an input device of the first electronic device, data representing a user input interaction, in the computer generated reality environment, with the displayed second entity, wherein the user input interaction with the displayed second entity represents a change to the state of the user-interactive visual component of the second entity;

in response to receiving the data representing the user input interaction with the second entity, transmitting the data representing the user input interaction with the second entity to the second electronic device;

subsequent to transmitting the data representing the user input interaction with the second entity to the second electronic device, obtaining, from the second electronic device, an update to the second scene graph based on the user input interaction with the displayed second entity representing the change to the state of the user-interactive visual component of the second entity; and updating the displayed computer generated reality environment based on the updated second scene graph.

16. The non-transitory computer-readable storage medium of claim 11, wherein the first entity includes a user-interactive visual component, and wherein the first scene graph includes information regarding a state of the user-interactive visual component, the one or more programs further including instructions for:

while displaying the computer generated reality environment that includes the visual representation of the first entity, receiving data representing a user input interaction, in the computer generated reality environment, with the first entity, wherein the user input interaction with the first entity represents a change to the state of the user-interactive visual component of the first entity; and in response to receiving the user input interaction with the first entity:
updating the first scene graph based on the user input interaction with the first entity representing a change to the state of the user-interactive visual component of the first entity; and
updating the displayed computer generated reality environment based on the updated first scene graph.

17. The non-transitory computer-readable storage medium of claim 16, wherein the data representing the user input interaction with the first entity is received from the second electronic device, and wherein the user input interaction with the first entity received from the second electronic device is a first user input interaction with the first entity, the one or more programs further including instructions for:

while displaying the computer generated reality environment that includes the visual representation of the first entity, receiving, from an input device of the first electronic device, data representing a second user input interaction, in the computer generated reality environment, with the first entity, wherein the second user input interaction with the first entity represents a change to the state of the user-interactive visual component of the first entity; and in response to receiving the second user input interaction with the first entity:
　　updating the first scene graph based on the second user input interaction with the first entity representing a change to the state of the user-interactive visual component of the first entity; and
　　updating the displayed computer generated reality environment based on the updated first scene graph.

18. The non-transitory computer-readable storage medium of claim 17, wherein the process executing on the first electronic device is a process of an application executing on the first electronic device, the one or more programs further including instructions for:
　　passing, by a process of an operating system of the first electronic device, the data representing the first user input interaction to the process of the application without an indication that the data representing the first user input interaction was received from the second electronic device; and
　　passing, by the process of the operating system of the first electronic device, the data representing the second user input interaction to the process of the application without an indication that the data representing the second user input interaction was received from an input device of the first electronic device.

19. The non-transitory computer-readable storage medium of claim 17, wherein the second electronic device attained strong ownership of the first entity in response to the user input interaction with the first entity, the one or more programs further including instructions for:
　　subsequent to receiving the data representing the user input interaction with the first entity from the second device, and while displaying the computer generated reality environment that includes the visual representation of the first entity:
　　　　receiving, from a third electronic device, data representing a user input interaction, in the computer generated reality environment, with the first entity representing a change to the state of the user-interactive visual component of the first entity; and
　　　　in response to receiving the data representing the user input interaction with the first entity from the third electronic device:
　　　　　　in accordance with a determination that an electronic device other than the third device has strong ownership of the first entity, discarding the data representing the user input interaction with the first entity received from the third electronic device; and
　　　　　　in accordance with a determination that no electronic device has strong ownership of the first entity, updating the first scene graph based on the data representing the user input interaction with the first entity received from the third electronic device.

20. The non-transitory computer-readable storage medium of claim 11, wherein one or more scene graphs, of the first scene graph and the second scene graph, includes information for outputting audio associated with the respective first or second entity, the one or more programs further including instructions for:
　　while displaying the computer generated reality environment, outputting audio, via an audio output device of the first electronic device, in accordance with the information for outputting audio in the one or more scene graphs,
　　wherein outputting audio comprises synchronizing audio output with at least one visual property of the computer generated reality environment.

21. A method for providing a multi-user computer generated reality environment, the method comprising:
　　at a first electronic device with one or more processors and memory:
　　　　displaying a computer generated reality environment, wherein the computer generated reality environment is responsive to input from the first electronic device and a second electronic device, wherein the second electronic device is external to the first electronic device;
　　　　while displaying the computer generated reality environment:
　　　　　　obtaining a first scene graph from a process executing on the first electronic device, wherein the first scene graph includes information for rendering a first entity in the computer generated reality environment;
　　　　　　obtaining a second scene graph from a process executing on the second electronic device, wherein the second scene graph includes information for rendering a second entity in the computer generated reality environment; and
　　　　　　updating the displayed computer generated reality environment based on the first scene graph and the second scene graph, wherein the displayed computer generated reality environment includes a visual representation of the first entity and a visual representation of the second entity.

22. The method of claim 21, further comprising:
transmitting the first scene graph to the second electronic device;
wherein the first scene graph includes information for rendering first visual content in the computer generated reality environment and information for rendering second visual content in the computer generated reality environment different than the first visual content;
wherein transmitting the first scene graph to the second electronic device comprises transmitting the information for rendering the first visual content in the computer generated reality environment to the second electronic device without transmitting the information for rendering the second visual content in the computer generated reality environment to the second electronic device; and
wherein the displayed computer generated reality environment includes a visual representation of the first visual content in the computer generated reality environment and a visual representation of the second visual content in the computer generated reality environment.

23. The method of claim 22, wherein:
the first scene graph including the first visual content and the second visual content were created by the process executing on the first electronic device;
obtaining the first scene graph comprises obtaining an indication, from the process executing on the first electronic device, that the second visual content is non-shareable; and
transmitting the first scene graph to the second electronic device comprises transmitting the first scene graph based at least in part on the indication that the second visual content is non-shareable.

24. The method of claim 21, wherein the process executing on the first electronic device is a process of an application executing on the first electronic device, the method further comprising combining, in a third scene graph by a process of an operating system of the first electronic device, the first scene graph and the second scene graph; and wherein updating the displayed computer generated reality environment based on the first scene graph and the second scene graph comprises updating, by the process of the operating system of the first electronic device, the displayed computer generated reality environment based on the third scene graph.

25. The method of claim 21, wherein the second entity includes a user-interactive visual component, and wherein obtaining the second scene graph includes obtaining information regarding a state of the user-interactive visual component, the method further comprising:

while displaying the computer generated reality environment that includes the visual representation of the second entity, receiving, from an input device of the first electronic device, data representing a user input interaction, in the computer generated reality environment, with the displayed second entity, wherein the user input interaction with the displayed second entity represents a change to the state of the user-interactive visual component of the second entity;

in response to receiving the data representing the user input interaction with the second entity, transmitting the data representing the user input interaction with the second entity to the second electronic device;

subsequent to transmitting the data representing the user input interaction with the second entity to the second electronic device, obtaining, from the second electronic device, an update to the second scene graph based on the user input interaction with the displayed second entity representing the change to the state of the user-interactive visual component of the second entity; and updating the displayed computer generated reality environment based on the updated second scene graph.

26. The method of claim 21, wherein the first entity includes a user-interactive visual component, and wherein the first scene graph includes information regarding a state of the user-interactive visual component, the method further comprising:

while displaying the computer generated reality environment that includes the visual representation of the first entity, receiving data representing a user input interaction, in the computer generated reality environment, with the first entity, wherein the user input interaction with the first entity represents a change to the state of the user-interactive visual component of the first entity; and in response to receiving the user input interaction with the first entity:

updating the first scene graph based on the user input interaction with the first entity representing a change to the state of the user-interactive visual component of the first entity; and updating the displayed computer generated reality environment based on the updated first scene graph.

27. The method of claim 26, wherein the data representing the user input interaction with the first entity is received from the second electronic device, and wherein the user input interaction with the first entity received from the second electronic device is a first user input interaction with the first entity, the method further comprising:

while displaying the computer generated reality environment that includes the visual representation of the first entity, receiving, from an input device of the first electronic device, data representing a second user input interaction, in the computer generated reality environment, with the first entity, wherein the second user input interaction with the first entity represents a change to the state of the user-interactive visual component of the first entity; and in response to receiving the second user input interaction with the first entity:

updating the first scene graph based on the second user input interaction with the first entity representing a change to the state of the user-interactive visual component of the first entity; and updating the displayed computer generated reality environment based on the updated first scene graph.

28. The method of claim 27, wherein the process executing on the first electronic device is a process of an application executing on the first electronic device, the method further comprising:

passing, by a process of an operating system of the first electronic device, the data representing the first user input interaction to the process of the application without an indication that the data representing the first user input interaction was received from the second electronic device; and passing, by the process of the operating system of the first electronic device, the data representing the second user input interaction to the process of the application without an indication that the data representing the second user input interaction was received from an input device of the first electronic device.

29. The method of claim 27, wherein the second electronic device attained strong ownership of the first entity in response to the user input interaction with the first entity, the method further comprising:

subsequent to receiving the data representing the user input interaction with the first entity from the second device, and while displaying the computer generated reality environment that includes the visual representation of the first entity:

receiving, from a third electronic device, data representing a user input interaction, in the computer generated reality environment, with the first entity representing a change to the state of the user-interactive visual component of the first entity; and in response to receiving the data representing the user input interaction with the first entity from the third electronic device:

in accordance with a determination that an electronic device other than the third device has strong ownership of the first entity, discarding the data representing the user input interaction with the first entity received from the third electronic device; and in accordance with a determination that no electronic device has strong ownership of the first entity, updating the first scene graph based on the data representing the user input interaction with the first entity received from the third electronic device.

30. The method of claim 21, wherein one or more scene graphs, of the first scene graph and the second scene graph, includes information for outputting audio associated with the respective first or second entity, the method further comprising:

while displaying the computer generated reality environment, outputting audio, via an audio output device of the first electronic device, in accordance with the information for outputting audio in the one or more scene graphs,
wherein outputting audio comprises synchronizing audio output with at least one visual property of the computer generated reality environment.

\* \* \* \* \*